United States Patent
Fan

(10) Patent No.: US 9,231,252 B2
(45) Date of Patent: Jan. 5, 2016

(54) ELECTROACTIVE PARTICLES, AND ELECTRODES AND BATTERIES COMPRISING THE SAME

(75) Inventor: Jiang Fan, San Diego, CA (US)

(73) Assignee: American Lithium Energy Corp., Vista, CA (US)

( * ) Notice: Subject to any disclaimer, the term of this patent is extended or adjusted under 35 U.S.C. 154(b) by 811 days.

(21) Appl. No.: 13/389,262

(22) PCT Filed: Jul. 22, 2010

(86) PCT No.: PCT/US2010/042977
§ 371 (c)(1),
(2), (4) Date: Feb. 7, 2012

(87) PCT Pub. No.: WO2011/019493
PCT Pub. Date: Feb. 17, 2011

(65) Prior Publication Data
US 2012/0132849 A1    May 31, 2012

Related U.S. Application Data

(60) Provisional application No. 61/232,432, filed on Aug. 9, 2009, provisional application No. 61/307,851, filed on Feb. 25, 2010.

(51) Int. Cl.
*H01B 1/08* (2006.01)
*H01M 4/62* (2006.01)
(Continued)

(52) U.S. Cl.
CPC ............... *H01M 4/621* (2013.01); *H01B 1/08* (2013.01); *H01M 4/0471* (2013.01); *H01M 4/13* (2013.01); *H01M 4/139* (2013.01); *H01M 4/364* (2013.01); *H01M 4/366* (2013.01); *H01M 4/505* (2013.01); *H01M 4/525* (2013.01); *H01M 4/5825* (2013.01); *Y02E 60/122* (2013.01)

(58) Field of Classification Search
CPC .................................... H01B 1/02; H01B 1/08
USPC ........... 252/500–519.1, 519.15, 521.2, 521.5, 252/521.6; 428/402; 977/773, 775, 777, 977/811, 948
See application file for complete search history.

(56) References Cited

U.S. PATENT DOCUMENTS 5,738,876 A    4/1998 Enevold
5,910,382 A    6/1999 Goodenough et al.
(Continued)

FOREIGN PATENT DOCUMENTS

WO    WO2007116718 A1 * 10/2007 ............. H01G 9/058

OTHER PUBLICATIONS

Choi ("Enhanced electrochemical properties of a Si-based anode using an electrochemically active polyamide imide binder." J Pow Sourc, 177, pp. 590-594, Dec. 2007).*
(Continued)

*Primary Examiner* — Tri V Nguyen

(57) ABSTRACT

Provided herein is a coated electroactive particle, comprising i) an electroactive agglomerated particle that comprises a first and second electroactive materials; and ii) a polymeric overcoating on the surface of the electroactive agglomerated particle. Also provided herein is a coated electroactive particle, comprising i) an agglomerated particle that comprises subparticles of a first electroactive material and subparticles of a second electroactive material; and ii) a polymeric overcoating on the surface of the electroactive agglomerated particle.

2 Claims, 5 Drawing Sheets

(51) Int. Cl.
*H01M 4/04* (2006.01)
*H01M 4/13* (2010.01)
*H01M 4/139* (2010.01)
*H01M 4/36* (2006.01)
*H01M 4/505* (2010.01)
*H01M 4/525* (2010.01)
*H01M 4/58* (2010.01)

(56) References Cited

U.S. PATENT DOCUMENTS

| | | | |
|---|---|---|---|
| 6,514,640 B1 | 2/2003 | Armand et al. | |
| 6,962,666 B2 | 11/2005 | Ravet et al. | |
| 7,060,238 B2 | 6/2006 | Saidi et al. | |
| 7,087,348 B2 | 8/2006 | Holman et al. | |
| 7,211,350 B2 | 5/2007 | Amatucci | |
| 7,214,446 B1 | 5/2007 | Bi et al. | |
| 2002/0187372 A1 | 12/2002 | Hall et al. | |
| 2004/0029011 A1 | 2/2004 | Ravet et al. | |
| 2004/0033360 A1* | 2/2004 | Armand et al. | 428/408 |
| 2004/0140458 A1 | 7/2004 | Ravet et al. | |
| 2004/0197660 A1* | 10/2004 | Sheem et al. | 429/231.95 |
| 2005/0003274 A1 | 1/2005 | Armand et al. | |
| 2005/0222333 A1 | 10/2005 | Hsu | |
| 2006/0127767 A1 | 6/2006 | Gauthier et al. | |
| 2006/0141341 A1* | 6/2006 | Nishino et al. | 429/62 |
| 2006/0286378 A1 | 12/2006 | Chiruvolu et al. | |
| 2007/0026316 A1 | 2/2007 | Imachi et al. | |
| 2007/0031732 A1 | 2/2007 | Chiang et al. | |
| 2007/0057228 A1 | 3/2007 | Huang et al. | |
| 2007/0065724 A1 | 3/2007 | Barker et al. | |
| 2008/0116423 A1 | 5/2008 | Fan et al. | |
| 2009/0155689 A1* | 6/2009 | Zaghib et al. | 429/221 |
| 2009/0267028 A1* | 10/2009 | Hoshiba | 252/500 |
| 2011/0272639 A1* | 11/2011 | Bramnik et al. | 252/506 |

OTHER PUBLICATIONS

Wilcox et al., "Factors Influencing the Quality of Carbon Coatings on $LiFePO_4$," J. Electrochem. Soc. 154:A389-A395 (2007).
Hu et al., "Electrochemical Performance of Sol-Gel Synthesized $LiFePO_4$ in Lithium Batteries," Lawrence Berkeley National Laboratory, Paper LBNL-53002 (2003).
Office Action mailed May 24, 2010, U.S. Appl. No. 11/872,713.
Office Action mailed Nov. 10, 2010, U.S. Appl. No. 11/872,713.
Examiner Interview Summary mailed Sep. 13, 2011, U.S. Appl. No. 11/872,713.
Advisory Action mailed Jan. 21, 2011, U.S. Appl. No. 11/872,713.

* cited by examiner

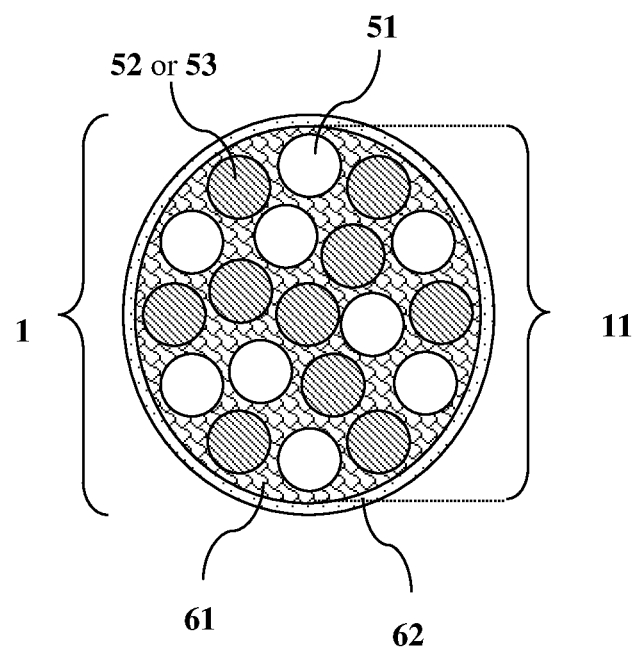
FIG. 6
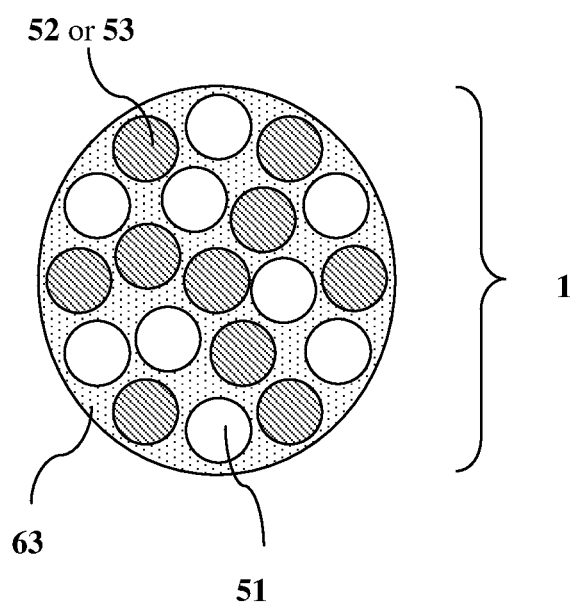

FIG. 8
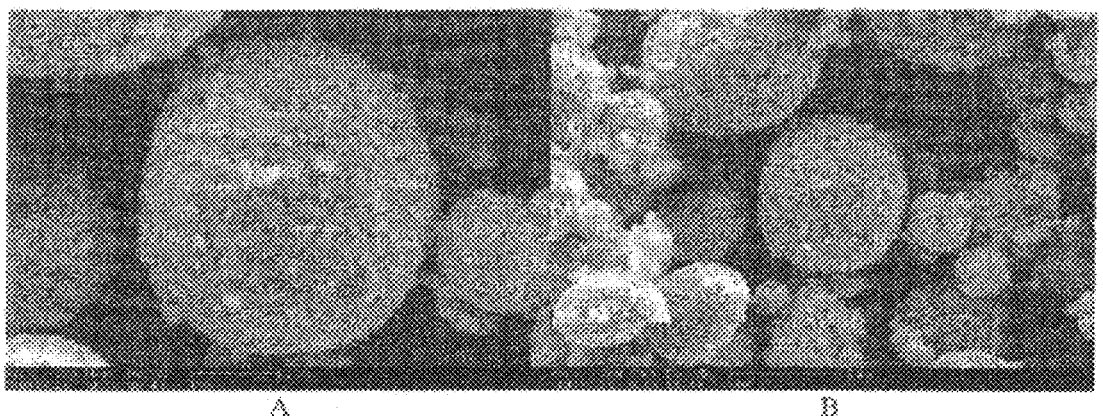
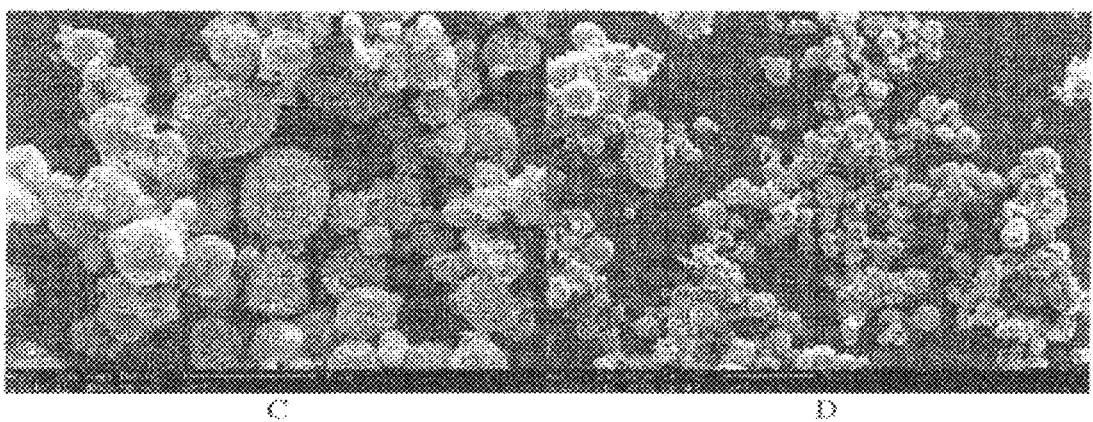
FIG. 9
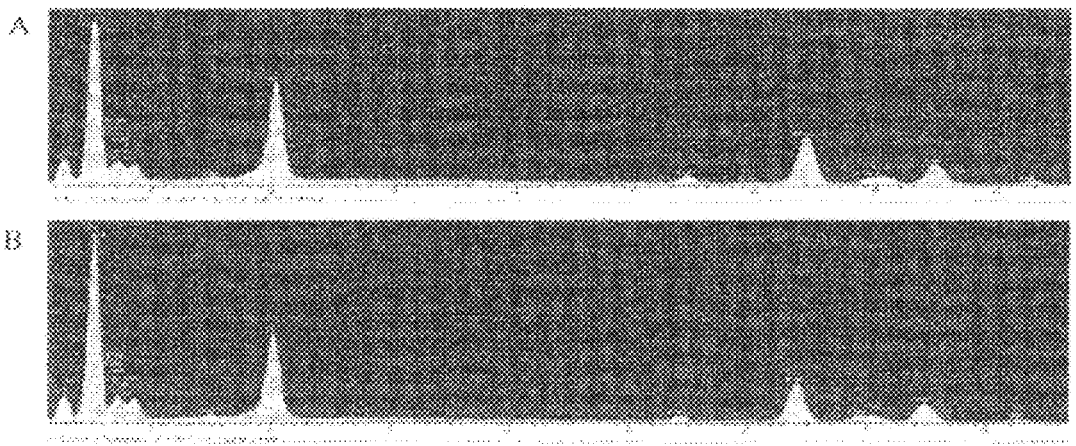

FIGS. 10
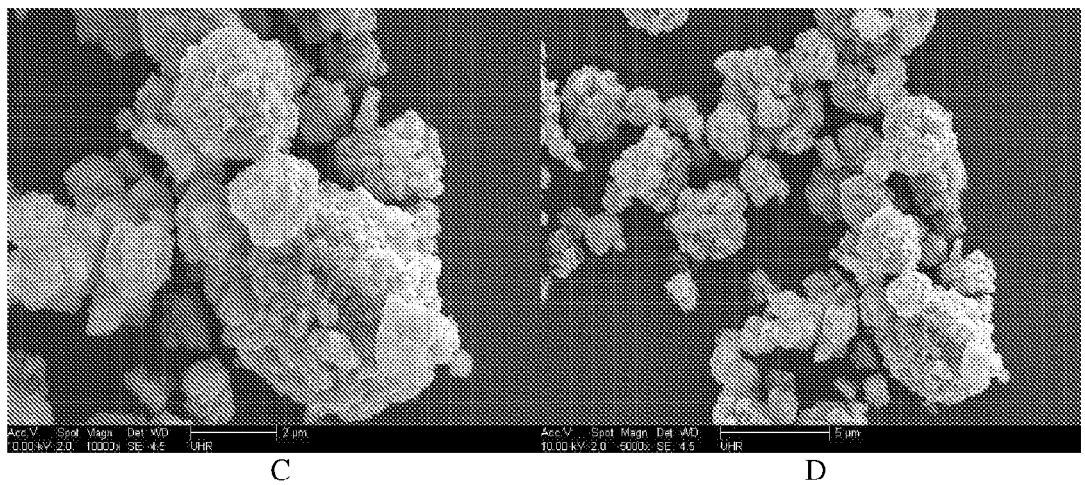
C                               D
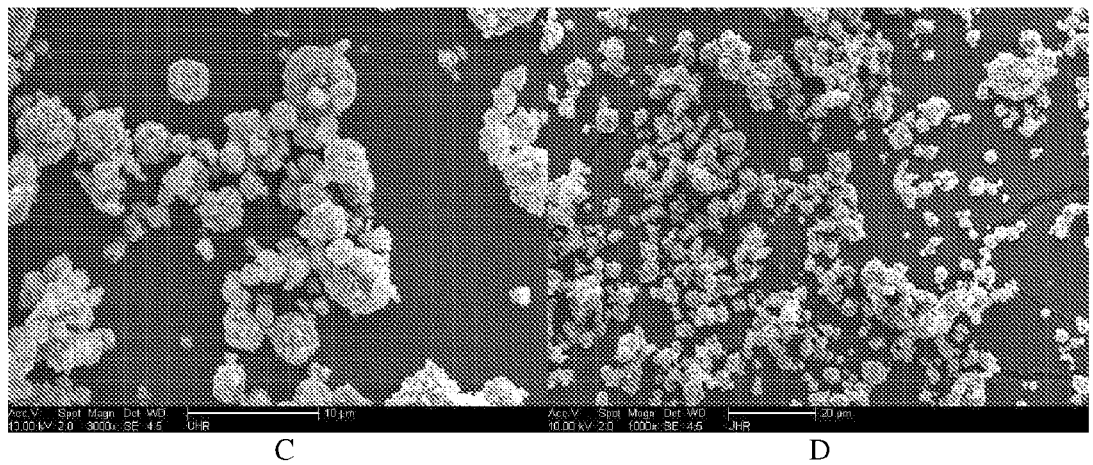
C                               D

ELECTROACTIVE PARTICLES, AND ELECTRODES AND BATTERIES COMPRISING THE SAME

CROSS REFERENCE TO RELATED APPLICATIONS

This application is a 371 of PCT/US2010/042977, filed Jul. 22, 2010, which claims the benefit of the priority to of U.S. Provisional Application Nos. 61/232,432, filed Aug. 9, 2009; and 61/307,851, filed Feb. 25, 2010; the disclosure of each of which is incorporated herein by reference in its entirety.

FIELD

Provided herein is a coated electroactive particle, comprising i) an electroactive agglomerated particle that comprises a first and second electroactive materials; and ii) a polymeric overcoating on the surface of the electroactive agglomerated particle. Also provided herein is a coated electroactive particle, comprising i) an agglomerated particle that comprises subparticles of a first electroactive material and subparticles of a second electroactive material; and ii) a polymeric overcoating on the surface of the electroactive agglomerated particle.

BACKGROUND

There is great interest in developing rechargeable lithium batteries with higher energy capacity and longer cycle life for applications in, e.g., portable electronic devices, electric vehicles, and implantable medical devices. Therefore, there is a need for a battery with high capacity and/or sufficient cycle performance.

SUMMARY OF THE DISCLOSURE

Provided herein is a coated electroactive particle, comprising i) an electroactive agglomerated particle that comprises a first and second electroactive materials; and ii) a polymeric overcoating on the surface of the electroactive agglomerated particle. In certain embodiments, the electroactive agglomerated particle further comprises a diluent. In certain embodiments, the electroactive agglomerated particle further comprises a binder. In certain embodiments, the binder is a polymeric binder. In certain embodiments, the binder is a polyamideimide. In certain embodiments, the binder is a polyimide. In certain embodiments, the polymeric overcoating is a polyamideimide. In certain embodiments, the polymeric overcoating is a polyimide.

Also provided herein is a coated electroactive particle, comprising i) an electroactive agglomerated particle that comprises subparticles of a first electroactive material and subparticles of a second electroactive material; and ii) a polymeric overcoating on the surface of the electroactive agglomerated particle. In certain embodiments, the electroactive agglomerated particle further comprises at least one diluent subparticle. In certain embodiments, the electroactive agglomerated particle further comprises a binder. In certain embodiments, the binder is a polymeric binder. In certain embodiments, the binder is a polyamideimide. In certain embodiments, the binder is a polyimide. In certain embodiments, the polymeric overcoating is a polyamideimide. In certain embodiments, the polymeric overcoating is a polyimide.

Further provided herein is a coated electroactive particle, comprising an electroactive agglomerated particle that comprises a first and second electroactive materials, and a polymeric binder; wherein the surface of the electroactive agglomerated particle is coated with the polymeric binder. In certain embodiments, the electroactive agglomerated particles further comprise at least one diluent. In certain embodiments, the polymeric binder is a polyamideimide. In certain embodiments, the polymeric binder is a polyimide.

Additionally provided herein is a coated electroactive particle, comprising an electroactive agglomerated particle that comprises a first and second electroactive materials, and a polymeric binder; wherein the surface of the electroactive agglomerated particle is coated with the polymeric binder. In certain embodiments, the electroactive agglomerated particles further comprise at least one diluent. In certain embodiments, the polymeric binder is a polyamideimide. In certain embodiments, the polymeric binder is a polyimide.

Provided herein is a coated electroactive particle, comprising an electroactive agglomerated particle that comprises subparticles of a first electroactive material, subparticles of a second electroactive material, and a polymeric binder; wherein the surfaces of the subparticles are coated with the polymeric binder. In certain embodiments, the electroactive agglomerated particles further comprise at least one diluent subparticle, wherein the surface of the diluent subparticle is coated with the polymeric binder. In certain embodiments, the polymeric binder is a polyamideimide. In certain embodiments, the polymeric binder is a polyimide.

Provided herein is a coated electroactive particle, comprising an electroactive agglomerated particle that comprises subparticles of a first electroactive material, subparticles of a second electroactive material, and a polymeric binder; wherein the surfaces of the subparticles are substantially coated with the polymeric binder. In certain embodiments, the electroactive agglomerated particles further comprise at least one diluent subparticle, wherein the surface of the diluent subparticle is substantially coated with the polymeric binder. In certain embodiments, the polymeric binder is a polyamideimide. In certain embodiments, the polymeric binder is a polyimide.

Provided herein is an electroactive agglomerated particle, which comprises a first electroactive material and $LiNi_{1-a-b}Al_aCo_bO_2$, where a and b are each independently from about 0.01 to about 0.9, with the proviso that the sum of a and b is less than 1. In certain embodiments, the electroactive agglomerated particle further comprises at least one diluent. In certain embodiments, the electroactive agglomerated particles further comprise a binder. In certain embodiments, the binder is a polymeric binder. In certain embodiments, the polymeric binder is a polyamideimide. In certain embodiments, the polymeric binder is a polyimide.

Provided herein is an electroactive agglomerated particle, which comprises subparticles of a first electroactive material and $LiNi_{1-a-b}Al_aCo_bO_2$ subparticles, where a and b are each independently from about 0.01 to about 0.9, with the proviso that the sum of a and b is less than 1. In certain embodiments, the electroactive agglomerated particle further comprises at least one diluent subparticle. In certain embodiments, the electroactive agglomerated particles further comprise a binder. In certain embodiments, the binder is a polymeric binder. In certain embodiments, the polymeric binder is a polyamideimide. In certain embodiments, the polymeric binder is a polyimide.

Provided herein is an electroactive agglomerated particle, which comprises a first electroactive material and $LiNi_{1-a-b}Al_aCo_bO_2$ subparticles, where a and b are each independently from about 0.01 to about 0.9, with the proviso that the sum of a and b is less than 1; wherein the $LiNi_{1-a-b}Al_aCo_bO_2$ subparticles are embedded in the electroactive agglomerated particle. In certain embodiments, the electroactive agglomerated particle further comprises at least one diluent. In certain embodiments, the electroactive agglomerated particles further comprise a binder. In certain embodiments, the binder is a polymeric binder. In certain embodiments, the polymeric binder is a polyamideimide. In certain embodiments, the polymeric binder is a polyimide.

Provided herein is an electroactive agglomerated particle, which comprises subparticles of a first electroactive material and $LiNi_{1-a-b}Al_aCo_bO_2$, where a and b are each independently from about 0.01 to about 0.9, with the proviso that the sum of a and b is less than 1; wherein the subparticles of the first electroactive material are embedded in the electroactive agglomerated particle. In certain embodiments, the electroactive agglomerated particle further comprises at least one diluent. In certain embodiments, the electroactive agglomerated particles further comprise a binder. In certain embodiments, the binder is a polymeric binder. In certain embodiments, the polymeric binder is a polyamideimide. In certain embodiments, the polymeric binder is a polyimide.

Provided herein is a method for preparing the coated electroactive particles, which comprises the steps of: i) covering the surfaces of electroactive agglomerated particles with a layer of a polymer in a solvent; and ii) curing the electroactive agglomerated particles at an elevated temperature to form the coated electroactive particles.

Provided herein is a method for preparing the coated electroactive particles, which comprises the steps of: i) covering the surfaces of electroactive agglomerated particles with a layer of a mixture of precursors of a polymer in a solvent; and ii) curing the electroactive agglomerated particles at an elevated temperature form the coated electroactive particles.

Provided herein is a method for preparing the coated electroactive particles, which comprises the steps of: i) mixing electroactive agglomerated particles with a polymer in a solvent to form a slurry; ii) air-injecting the slurry to form particles; and iii) curing the particles from step ii) at an elevated temperature to form the coated electroactive particles.

Provided herein is a method for preparing the coated electroactive particles, which comprises the steps of: i) mixing electroactive agglomerated particles with a mixture of precursors of a polymer in a solvent to form a slurry; ii) air-injecting the slurry to form particles; and iii) curing the particles from step ii) at an elevated temperature to form the coated electroactive particles.

Provided herein is a method for preparing the coated electroactive particles, which comprises the steps of: i) mixing a first and second electroactive materials with a polymer in a solvent to form a slurry; ii) air-injecting the slurry to form agglomerated particles; and iii) curing the agglomerated particles from step ii) at an elevated temperature to form the coated electroactive particles.

Provided herein is a method for preparing the coated electroactive particles, which comprises the steps of: i) mixing subparticles of a first electroactive materials and subparticles of a second electroactive material with a polymer in a solvent to form a slurry; ii) air-injecting the slurry to form agglomerated particles; and iii) curing the agglomerated particles from step ii) at an elevated temperature to form the coated electroactive particles.

Provided herein is a method for preparing the coated electroactive particles, which comprises the steps of: i) mixing a first and second electroactive materials with a mixture of precursors of a polymer in a solvent to form a slurry; ii) air-injecting the slurry to form coated particles; and iii) curing the coated particles from step ii) at an elevated temperature to form the coated electroactive particles.

Provided herein is a method for preparing the coated electroactive particles, which comprises the steps of: i) mixing subparticles of a first electroactive material and subparticles of a second electroactive material with a mixture of precursors of a polymer in a solvent to form a slurry; ii) air-injecting the slurry to form particles; and iii) curing the particles from step ii) at an elevated temperature to form the coated electroactive particles.

Provided herein is a method for preparing the electroactive agglomerated particles, which comprises mixing a first and second electroactive materials to form electroactive agglomerated particles. In one embodiment, the method further comprises heating the electroactive agglomerated particles at an elevated temperature.

Provided herein is a method for preparing the electroactive agglomerated particles, which comprises mixing subparticles of a first electroactive material and subparticles of a second electroactive material to form electroactive agglomerated particles. In one embodiment, the method further comprises curing the electroactive agglomerated particles at an elevated temperature.

Provided herein is a method for preparing the electroactive agglomerated particles, which comprises the steps of: i) mixing a first and second electroactive materials with a polymer in a solvent to form a slurry; and ii) air-injecting the slurry to form electroactive agglomerated particles. In one embodiment, the method further comprises curing the electroactive agglomerated particles at an elevated temperature.

Provided herein is a method for preparing the electroactive agglomerated particles, which comprises the steps of: i) mixing subparticles of a first electroactive materials and subparticles of a second electroactive material with a polymer in a solvent to form a slurry; and ii) air-injecting the slurry to form electroactive agglomerated particles. In one embodiment, the method further comprises heating the electroactive agglomerated particles at an elevated temperature.

Provided herein is a method for preparing the electroactive agglomerated particles, which comprises the steps of: i) mixing a first and second electroactive materials with a mixture of precursors of a polymer in a solvent to form a slurry; and ii) air-injecting the slurry to form electroactive agglomerated particles. In one embodiment, the method further comprises heating the electroactive agglomerated particles at an elevated temperature.

Provided herein is a method for preparing the electroactive agglomerated particles, which comprises the steps of: i) mixing subparticles of a first electroactive material and subparticles of a second electroactive material with a mixture of precursors of a polymer in a solvent to form a slurry; and ii) air-injecting the slurry to form electroactive agglomerated particles. In one embodiment, the method further comprises heating the electroactive agglomerated particles at an elevated temperature.

BRIEF DESCRIPTION OF THE FIGURES

FIG. 5 is a cross-sectional view of a coated electroactive particle 1, comprising i) an electroactive agglomerated particle 11 (a big inner circle) that comprises subparticles of a first electroactive material 51 (open circles), subparticles of a second electroactive material 52 (shaded circles) or subparticles of a diluent material 53 (shaded circles), and optionally a binder 61; and ii) a polymeric overcoating 62 (dotted area) on the surface of the electroactive agglomerated particle 11.

FIG. 6 is a cross-sectional view of a coated electroactive particle 1, comprising an electroactive agglomerated particle 11 (a big circle) that comprises subparticles of a first electroactive material 51 (open circles), subparticles of a second electroactive material 52 (shaded circles) or subparticles of a diluent material 53 (shaded circles), and a polymeric binder 63 (dotted area within the big circle).

FIGS. 8A, 8B, 8C, and 8D are SEM images of coated electroactive particles that were prepared from $LiFePO_4$ and doped $LiNiO_2$ nanoparticles, and a polyamideimide.

FIGS. 9A and 9B are EDX spectra of two individual coated electroactive particles, which were prepared from $LiFePO_4$ and doped $LiNiO_2$ nanoparticles, and a polyamideimide.

FIGS. 10A, 10B, 10C, and 10D are SEM images of coated electroactive particles that were prepared from $LiFePO_4$ and doped $LiNiO_2$ nanoparticles, and CMC.

DETAILED DESCRIPTION

Figure 1:
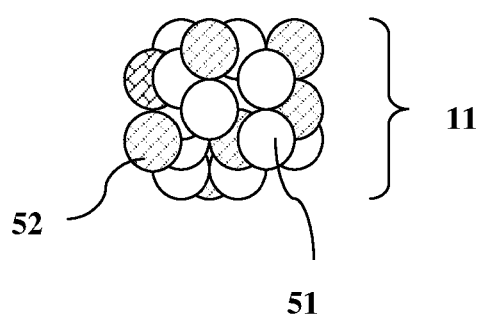
FIG. 1 is a schematic drawing of an agglomerated particle 11 comprising two types of subparticles, e.g., subparticles of a first electroactive material 51 (clear circles) and subparticles of a second electroactive material 52 (shaded circles).
Figure 2:
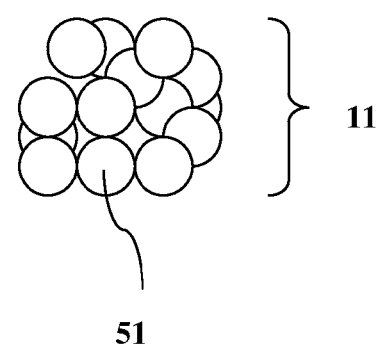
FIG. 2 is a schematic drawing of an agglomerated particle 11 comprising a single type of subparticles, e.g., subparticles of a single electroactive material 51.

To facilitate understanding of the disclosure set forth herein, a number of terms are defined below.

Generally, the nomenclature used herein and the laboratory procedures in electrochemistry, inorganic chemistry, polymer chemistry, organic chemistry, and others described herein are those well known and commonly employed in the art. Unless defined otherwise, all technical and scientific terms used herein generally have the same meaning as commonly understood by one of ordinary skill in the art to which this disclosure belongs.

The term "metal" refers to both metals and metalloids, including silicon and germanium. The phrase "a main group metal" is intended to include Sn, Si, Al, Bi, Ge, and Pb.

The term "anode" or "negative electrode" refers to an electrode where electrochemical oxidation occurs during discharging process. For example, an anode undergoes delithiation during discharging.

The term "cathode" or "positive electrode" refers to an electrode where electrochemical reduction occurs during discharging process. For example, a cathode undergoes lithiation during discharging.

The term "charging" refers to a process of providing electrical energy to an electrochemical cell.

The term "discharging" refers to a process of removing electrical energy from an electrochemical cell. In certain embodiments, discharging refers to a process of using the electrochemical cell to do useful work.

The term "electrochemically active," "electrically active," and "electroactive" are used interchangeably and refer to a material that is capable to incorporate lithium in its atomic lattice structure.

The term "lithiation" refers to a chemical process of inserting lithium into an electroactive material in an electrochemical cell. In certain embodiments, an electrode undergoes electrochemical reduction during lithiation process.

The term "delithiation" refers to a chemical process of removing lithium from an electroactive material in an electrochemical cell. In certain embodiments, an electrode undergoes electrochemical oxidation during delithiation process.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Coated Electroactive Particle

In one embodiment, provided herein is a coated electroactive particle, comprising i) an electroactive agglomerated particle that comprises a first and second electroactive materials; and ii) a polymeric overcoating on the surface of the electroactive agglomerated particle. In certain embodiments, the surface of the electroactive agglomerate particle is substantially covered by the polymeric overcoating.

In another embodiment, provided herein is a coated electroactive particle, comprising i) an electroactive agglomerated particle comprising subparticles of a first electroactive material and subparticles of a second electroactive material; and ii) a polymeric overcoating on the surface of the agglomerated particle. In certain embodiments, the surface of the electroactive agglomerate particle is substantially covered by the polymeric overcoating.

In certain embodiments, the electroactive agglomerated particle further comprises at least one diluent. In certain embodiments, the electroactive agglomerated particle further comprises at least one diluent subparticle.

In certain embodiments, the electroactive agglomerated particle further comprises a binder. In certain embodiments, the binder is polymeric binder. In certain embodiments, the polymeric binder is a polyamideimide. In certain embodiments, the polymeric binder is a polyimide.

In certain embodiments, the polymeric overcoating is a polyamideimide. In certain embodiments the polymeric overcoating is a polyimide.

In certain embodiments, the polymeric binder and polymeric overcoating are different. In certain embodiments, the polymeric binder and polymeric overcoating are the same polymer. In certain embodiments, the polymeric binder and polymeric overcoating are the same polyamideimide. In certain embodiments, the polymeric binder and polymeric overcoating are the same polyimide.

In yet another embodiment, provided herein is a coated electroactive particle, which comprises an electroactive agglomerated particle comprising a first and second electroactive materials, and a polymeric binder; wherein the surface of the electroactive agglomerated particle is coated with the polymeric binder. In certain embodiments, the polymeric binder is a polyamideimide. In certain embodiments, the polymeric binder is a polyimide.

In yet another embodiment, provided herein is a coated electroactive particle, which comprises an electroactive agglomerated particle comprising subparticles of a first electroactive material, subparticles of a second electroactive material, and a polymeric binder; wherein the surfaces of the electroactive subparticles are coated with the polymeric binder. In certain embodiments, the polymeric binder is a polyamideimide. In certain embodiments, the polymeric binder is a polyimide.

In yet another embodiment, provided herein is a coated electroactive particle, which comprises an electroactive agglomerated particle comprising a first and second electroactive materials, and a polymeric binder; wherein the surface of the electroactive agglomerated particle is substantially coated with the polymeric binder. In certain embodiments, the polymeric binder is a polyamideimide. In certain embodiments, the polymeric binder is a polyimide.

In yet another embodiment, provided herein is a coated electroactive particle, which comprises an electroactive agglomerated particle comprising subparticles of a first electroactive material, subparticles of a second electroactive material, and a polymeric binder; wherein the surfaces of the electroactive subparticles are substantially coated with the polymeric binder. In certain embodiments, the polymeric binder is a polyamideimide. In certain embodiments, the polymeric binder is a polyimide.

In one embodiment, the electroactive agglomerated particle further comprises at least one diluent. In another embodiment, the electroactive agglomerated particle further comprises at least one diluent subparticle, wherein the surface of the diluent subparticle is substantially coated with the polymeric binder.

In certain embodiments, the diluent is carbon, carbon nanotube (SWNT or MWNT), carbon nanofiber, Al, Ti, or a mixture thereof. In certain embodiments, the diluent subparticle is a carbon subparticle, carbon nanotube (SWNT or MWNT), carbon nanofiber, Al subparticle, Ti subparticle, or a mixture thereof. In certain embodiments, the diluent subparticle is a carbon nanoparticle, including, but not limited to, carbon nanotube (SWNT or MWNT), carbon nanofiber, graphite nanoparticle, and disordered carbon nanoparticle; Al nanoparticle; Ti nanoparticle, or a mixture thereof.

The coated electroactive particle provided herein can have various shapes, including, but not limited to, sphere, spheroid, platelet, fibril, or fiber. In certain embodiments, the coated electroactive particle is substantially spherical. In certain embodiments, the coated electroactive particle is spherical. In certain embodiments, the coated electroactive particle is spheroidal. In certain embodiments, the coated electroactive particle is in the shape of fibril or fiber.

In certain embodiments, the coated electroactive particle has an average particle size ranging from about 100 nm to about 100 µm, from about 500 nm to about 50 µm, from about 1 to about 20 µm, from about 2 to about 15 µm, from about 3 to about 10 µm, or from about 3 to about 5 µm. In certain embodiments, the coated electroactive particle has an average particle size of about 1 µm, about 2 µm, about 3 µm, about 4 µm, about 5 µm, about 6 µm, about 7 µm, about 8 µm, about 9 µm, or about 10 µm. In certain embodiments, the coated electroactive particle has an average particle size of about 3 µm. In certain embodiments, the coated electroactive particle has an average particle size of about 4 µm. In certain embodiments, the coated electroactive particles have an average particle size of about 5 µm.

In certain embodiments, the coated electroactive particle in the shape of sphere or platelet has an average particle size ranging from about 100 nm to about 100 µm, from about 500 nm to about 50 µm, from about 1 to about 20 µm, from about 2 to about 15 µm, from about 3 to about 10 µm, or from about 3 to about 5 µm. In certain embodiments, the coated electroactive particle in the shape of sphere or platelet has an average particle size of about 1 µm, about 2 µm, about 3 µm, about 4 µm, about 5 µm, about 6 µm, about 7 µm, about 8 µm, about 9 µm, or about 10 µm. In certain embodiments, the coated electroactive particle in the shape of sphere or platelet has an average particle size of about 3 µm. In certain embodiments, the coated electroactive particle in the shape of sphere or platelet has an average particle size of about 4 µm. In certain embodiments, the coated electroactive particle in the shape of sphere or platelet has an average particle size of about 5 µm.

In certain embodiments, the coated electroactive particle in the shape of spheroid has an average particle size ranging from about 100 nm to about 100 µm, from about 500 nm to about 50 µm, from about 1 to about 20 µm, from about 2 to about 15 µm, from about 3 to about 10 µm, or from about 3 to about 5 µm. In certain embodiments, the coated electroactive particle in the shape of spheroid has an average particle size of about 1 µm, about 2 µm, about 3 µm, about 4 µm, about 5 µm, about 6 µm, about 7 µm, about 8 µm, about 9 µm, or about 10 µm. In certain embodiments, the coated electroactive particle in the shape of spheroid has an average particle size of about 3 µm. In certain embodiments, the coated electroactive particle in the shape of spheroid has an average particle size of about 4 µm. In certain embodiments, the coated electroactive particle in the shape of spheroid has an average particle size of about 5 µm.

In certain embodiments, the coated electroactive particle in the shape of fibril or fiber has an average diameter ranging from about 1 to about 500 nm, from about 2 to about 250 nm, from about 5 to about 100 nm, from about 10 to about 50 nm, or from about 20 to about 40 nm. In certain embodiments, the coated electroactive particle in the shape of fibril or fiber has an average diameter of about 5 nm, about 10 nm, about 15 nm, about 20 nm, about 25 nm, about 30 nm, about 35 nm, about 40 nm, about 45 nm, about 50 nm, about 60 nm, about 70 nm, about 80 nm, about 90 nm, or about 100 nm. In certain embodiments, the coated electroactive particle in the shape of fibril or fiber has an average particle size of about 20 to about 40 nm. In certain embodiments, the coated electroactive particle in the shape of fibril or fiber has an average particle size of about 25 nm.

In certain embodiments, the coated electroactive particle in the shape of fibril or fiber has an average length ranging from about 50 nm to about 1,000 µm, from about 50 nm to about 100 µm, or from about 50 nm to about 10 µm. In certain embodiments, the coated electroactive particle in the shape of fibril or fiber has an average length of about 50 nm, about 100 nm, about 250 nm, about 500 nm, about 1 µm, about 2 µm, about 5 µm, about 10 µm, about 20 µm, or about 100 µm.

The particle sizes and particle size distributions of the particles and subparticles provided herein can be determined using any methods known to by one of ordinary skill in the art, including, but not limited to, laser light scattering and microscopic imaging.

In certain embodiments, the coated electroactive particle has an average surface area ranging from about 0.1 to about 100 m$^2$/g, from about 1 to about 50 m$^2$/g, from about 2 to about 20 m$^2$/g, from about 5 to about 20 m$^2$/g, from about 2 to about 15 m$^2$/g, from about 2 to about 10 m$^2$/g, or from about 10 to about 15 m$^2$/g.

In certain embodiments, the coated electroactive particle is porous. In certain embodiments, the coated electroactive particle has porosity as measured by density, ranging from about 0.1 to about 5 g/cm$^3$, from about 0.2 to about 3 g/cm$^3$, from about 0.5 to about 2 g/cm$^3$, or from about 0.5 to about 1 g/cm$^3$. In certain embodiments, the coated electroactive particle has porosity of about 0.5, about 1, about 1.5, about 2, about 2.5, about 3, about 3.5, about 4, about, 4.5, or about 5 g/cm$^3$.

In certain embodiments, the coated electroactive particles have such particle size distribution that 10% of the coated electroactive particles have a particle size of about 0.05 µm, about 0.1 µm, or about 1 µm; and 90% of the coated electroactive particles have a particle size of about 100 µm, about 50 µm, about 20 µm, about 10 µm, or about 5 µm. In certain embodiments the coated electroactive particles have such particle size distribution that 10% of the coated electroactive particles have a particle size of about 1 µm and 90% of the coated electroactive particles have a particle size of about 10 µm.

In certain embodiments, the coated electroactive particle has a particle size ranging from about 100 nm to about 500 µm, from about 200 nm to about 200 µm, from about 500 nm to about 100 µm, from about 1 to about 50 µm, from about 10 to about 50 µm, from about 10 to about 40 µm, from about 10 to about 30 µm, or from about 10 to about 20 µm. In certain embodiments, the coated electroactive particle has a particle size in the range from about 1 to about 50 µm.

In certain embodiments, the volume change of the coated electroactive particle during a charging/discharging cycle is no more than about 400%, no more than about 350%, no more than about 300%, no more than about 250%, no more than about 200%, no more than about 150%, no more than about 100%, no more than about 50%, no more than about 25%, or no more than about 10%.

Without being bound to any theory, one advantage of the coated electroactive particle is that the electroactive particle can be used to make electrodes using conventional processing techniques, such as reverse roll coating or doctor blade coating. Without being bound to any theory, another advantage is that one of the two electroactive materials in the coated electroactive particle can enhance the electrical or ionic conductivity of the other without reducing specific capacity. For example, with the coated electroactive particle that comprises an electroactive agglomerated particle comprising $LiFePO_4$ and $LiAlNiCoO_2$ subparticles, the voltage behaviors of both the $LiFePO_4$ and $LiAlNiCoO_2$ materials are retained, so that the coated electroactive particle behaves as a superposition of the two.

Electroactive Agglomerated Particle

In one embodiment, provided herein is an electroactive agglomerated particle comprising two or more electroactive materials. In another embodiment, provided herein is an electroactive agglomerated particle comprising at least two types of electroactive subparticles. In yet another embodiment, the at least two types of subparticles each comprise a different electroactive material. In still another embodiment, the first type is subparticles of a first electroactive material, and the second type is subparticles of a second electroactive material.

In one embodiment, provided herein is an electroactive agglomerated particle comprising a first and second electroactive materials.

In another embodiment, provided herein is an electroactive agglomerated particle comprising subparticles of a first electroactive material and subparticles of a second electroactive material. In certain embodiment, the electroactive agglomerated particle is as shown in FIG. 1.

In yet another embodiment, provided herein is an electroactive agglomerated particle comprising a first electroactive material and $LiNi_{1-a-b}Al_aCo_bO_2$, where a and b are each as defined herein.

In yet another embodiment, provided herein is an electroactive agglomerated particle comprising subparticles of a first electroactive material and $LiNi_{1-a-b}Al_aCo_bO_2$ subparticles, where a and b are each as defined herein.

Figure 3:
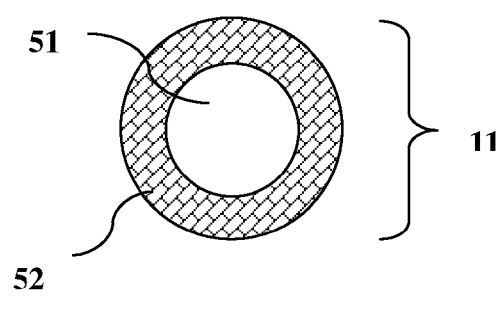
FIG. 3 is a cross-sectional view of an electroactive agglomerated particle 11 comprising a subparticle of a first electroactive material 51 (an open circle) embedded in a second electroactive material 52 (a shaded circle).
Figure 4:
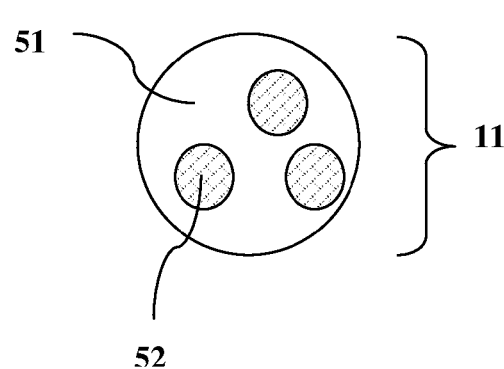
FIG. 4 is a cross-sectional view of an electroactive agglomerated particle 11 of a first electroactive material 51 (a clear circle) embedded with subparticles (e.g., nanoparticles) of a second electroactive material 52 (shaded circles).
Figure 7:
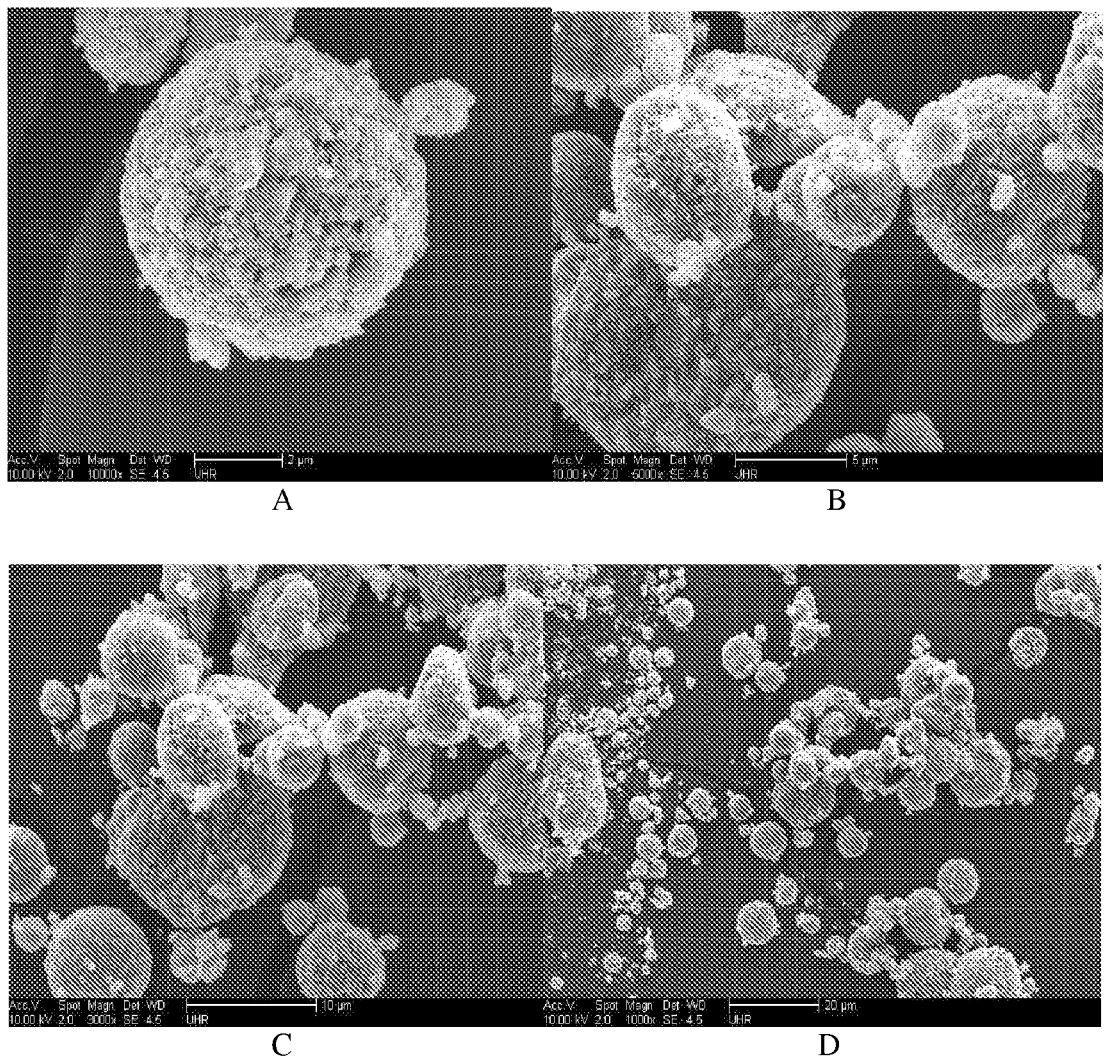
FIGS. 7A, 7B, 7C, and 7D are SEM images of coated electroactive particles that were prepared from $LiFePO_4$ and doped $LiNiO_2$ nanoparticles, and a polyamideimide.

In yet another embodiment, provided herein is an electroactive agglomerated particle comprising a first electroactive material and $LiNi_{1-a-b}Al_aCo_bO_2$ subparticles, where a and b are each as defined herein; wherein the $LiNi_{1-a-b}Al_aCo_bO_2$ subparticles are embedded in the electroactive agglomerated particle (FIG. 3 or 4).

In still another embodiment, provided herein is an electroactive agglomerated particle comprising subparticles of a first electroactive material and $LiNi_{1-a-b}Al_aCo_bO_2$, where a and b are each as defined herein; wherein the subparticles of the first electroactive material are embedded in the electroactive agglomerated particle (FIG. 3 or 4).

In one embodiment, the electroactive agglomerated particle provided herein further comprises at least one diluent or diluent subparticle. In certain embodiments, the amount of the at least one diluent or diluents subparticle in the electroactive agglomerated particle is ranging from about 0.01 to about 20% by weight, from about 0.05 to about 10% by weight, from about 1 to about 10% by weight, from about 0.1 to about 5% by weight, from about 1 to about 5% by weight, from about 0.2 to about 2% by weight, from about 1 to about 2% by weight, from about 0.3 to about 1.5% by weight, or from about 0.5 to about 1% by weight of the electroactive agglomerated particle. In certain embodiments, the amount of the at least one diluent or diluents subparticle in the electroactive agglomerated particle is ranging from about 1 to about 10% by weight, from about 1 to about 5% by weight, from about 1 to about 2% by weight, from about 0.3 to about 1.5% by weight, or from about 0.5 to about 1% by weight of the electroactive agglomerated particle. In certain embodiments, the amount of the at least one diluent or diluents subparticle in the electroactive agglomerated particle is about 0.3% by weight, about 0.5% by weight, about 0.7% by weight, about 0.9% by weight, about 1% by weight, about 1.1% by weight, about 1.2% by weight, about 1.3% by weight, about 1.4% by weight, about 1.5% by weight, about 1.6% by weight, about 1.7% by weight, about 1.8% by weight, about 1.9% by weight, about 2% by weight, about 2.5% by weight, about 3% by weight, about 3.5% by weight, about 4% by weight, about 4.5% by weight, or about 5% by weight of the electroactive agglomerated particle.

Suitable diluent materials include, but are not limited to, acetylene black, ketjen black, furnace black, lamp black, carbon (including, but not limited to, disordered carbon, carbon black, graphite, carbon nanotubes, single-walled nanotubes, multi-wall nanotubes, and carbon fibers), aluminum, aluminum oxide, chromium, chromium boride, chromium carbide, copper, cobalt, gold, hafnium boride, hafnium carbide, hafnium nitride, iron, lead, molybdenum, molybdenum boride, molybdenum carbide, molybdenum silicide, molybdenum trioxide, nickel, platinum, silica (silicon dioxide), silver, SnCoC, titanium, titanium boride, titanium carbide, titanium dioxide, titanium nitride, titanium silicide, tungsten, tungsten boride, tungsten carbide, tungsten silicide, tungsten trioxide, vanadium silicide, zirconium boride, zirconium carbide, zirconium nitride, zirconium oxide, and combinations thereof.

In certain embodiments, the diluent or diluent subparticle is carbon. In certain embodiments, the diluent or diluent subparticle is a carbon subparticle. In certain embodiments, the diluent or diluent subparticle is a carbon nanoparticle. In certain embodiments, the diluent or diluent subparticle is a disordered carbon nanoparticle. In certain embodiments, the diluent or diluent subparticle is a graphite nanoparticle. In certain embodiments, the diluent or diluent subparticle is a carbon nanotube. In certain embodiments, the diluent or diluent subparticle is a carbon SWNT. In certain embodiments, the diluent or diluent subparticle is a carbon MWNT. In certain embodiments, the diluent or diluent subparticle is a carbon nanofiber. In certain embodiments, the diluent or diluent subparticle is an Al nanoparticle or Ti nanoparticle.

In certain embodiments, the diluent or diluent subparticle used herein has various shapes, including, but not limited to, sphere, spheroid, fibril, fiber, or platelet. In certain embodiments, the diluent subparticle used herein is substantially spherical. In certain embodiments, the diluent subparticle used herein is spherical. In certain embodiments, the diluent subparticle used herein is spheroid.

In certain embodiments, the diluent or diluent subparticle used herein has an average particle size ranging from about 10 nm to about 100 µm, from about 10 nm to about 10 µm, from about 20 nm to about 5 µm, from about 20 nm to about 1 µm, from about 20 to about 500, from about 50 to about 500 nm, from about 50 to about 400 nm, from about 50 to about 200 nm, or from about 100 to about 200 nm. In certain embodiments, the diluent subparticle used herein has an average particle size ranging about 50 nm, about 100 nm, about 150 nm, about 200 nm, about 300 nm, about 400 nm, about 500 nm, about 1 µm, about 2 µm, about 5 µm, or about 10 µm. In certain embodiments, the diluent subparticle used herein has an average particle size ranging from about 10 to about 500 nm, from about 10 to about 200 nm, or from about 20 to about 100 nm.

In another embodiment, the electroactive agglomerated particle provided herein further comprises a binder. Suitable binders include, but are not limited to, asphalt pitch, pitch coke, petroleum coke, sugars (e.g., sucrose), coal tar, fluoranthene, pyrene, chrysene, phenanthrene, anthracene, naphthalin, fluorine, biphenyl, acenephthene, solid ionic conductors, polymeric binders, and mixtures thereof.

In certain embodiments, the binder is asphalt pitch, pitch coke, petroleum coke, sugars, coal tar, fluoranthene, pyrene, chrysene, phenanthrene, anthracene, naphthalin, fluorine, biphenyl, or acenephthene, wherein the binder is subsequently carbonized, in one embodiment, in an inert gas atmosphere, so that the subparticles are coated with and bound together by a carbonized layer. In one embodiment, the amount of the carbonized binder in the electroactive agglomerated particle is ranging from about 0.1 to about 20%, from about 0.5 to about 10%, or from about 1 to about 5% of the weight of the electroactive agglomerated particle. In certain embodiments, the inert gas that is used in the carbonization process is argon, nitrogen, or carbon dioxide. In certain embodiments, the carbonization is performed at a temperature ranging from about 250 to about 1,000° C., from about 300 to about 900° C., from about 400 to about 800° C., or from about 500 to about 700° C.

In certain embodiments, the binder is a solid ionic conductor. In certain embodiments, the binder is a solid ionic conductor selected from the group consisting of $Li_3PO_4$; a mixture of lithium nitride and lithium phosphate; a mixture of lithium phosphorus oxynitride and lithium phosphate; $Li_{1+x+y}(Al, Ga)_x(Ti, Ge)_{2-x}Si_yP_3-yO_{12}$, where $0 \leq x \leq 1$ and $0 \leq y \leq 1$; and $Li_xSi_yM_zO_vN_w$, where $0.3 \leq x \leq 0.46$, $0.05 \leq y \leq 0.15$, $0.016 \leq z \leq 0.05$, $0.42 \leq v < 0.05$, $0 \leq x \leq 0.029$, and M is selected from the group consisting of Nb, Ta, and W.

In certain embodiments, the binder is a polymeric binder. Suitable polymeric binders include, but are not limited to, polyamideimides, polyimides, polytetrafluoroethylene (PTFE), carboxymethyl cellulose (CMC), polyvinylidene fluoride (PVDF), polyvinyl alcohol (PVA), styrene butadiene rubber (SBR), and mixtures thereof. In certain embodiments, the polymeric binder is a polyamideimide. In certain embodiments, the polymeric binder is a polyimide. In certain embodiments, the polymeric binder is a carboxymethyl cellulose.

In certain embodiments, the binder is a crosslinkable polymeric binder. Suitable crosslinkable polymeric binders include, but are not limited to, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In certain embodiments, the crosslinkable polymeric binder is a polyamideimide. In certain embodiments, the crosslinkable polymeric binder is a polyimide. In certain embodiments, the crosslinkable polymeric binder is a carboxymethyl cellulose.

In certain embodiments, the crosslinkable polymeric binder is a thermally crosslinkable polymeric binder. Suitable thermally crosslinkable polymeric binders include, but are not limited to, carboxymethyl celluloses (CMC), polyamideimides, polyimides, and mixtures thereof. In certain embodiments, the thermally crosslinkable polymeric binder is a polyamideimide. In certain embodiments, the thermally crosslinkable polymeric binder is a polyimide. In certain embodiments, the thermally crosslinkable polymeric binder is a carboxymethyl cellulose.

In certain embodiments, the crosslinkable polymeric binder is a photo-crosslinkable polymeric binder. Suitable photo-crosslinkable polymeric binders include, but are not limited to, polybenzophenones, polyacrylates, polyvinyls, polystyrenes, polysulfones, 2,3-dihydrofuran-containing polymers, styrene-containing copolymers, and mixtures thereof.

In certain embodiments, the binder is a crosslinked polymeric binder. Suitable crosslinked polymeric binders include, but are not limited to, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In certain embodiments, the crosslinked polymeric binder is a polyamideimide. In certain embodiments, the crosslinked polymeric binder is a polyimide. In certain embodiments, the crosslinked polymeric binder is a carboxymethyl cellulose.

In certain embodiments, the crosslinked polymeric binder is a thermally crosslinked polymeric binder. Suitable thermally crosslinked polymeric binders include, but are not limited to, carboxymethyl celluloses (CMC), polyamideimides, polyimides, and mixtures thereof. In certain embodiments, the thermally crosslinked polymeric binder is a polyamideimide. In certain embodiments, the thermally crosslinked polymeric binder is a polyimide. In certain embodiments, the thermally crosslinked polymeric binder is a carboxymethyl cellulose.

In certain embodiments, the crosslinked polymeric binder is a photo-crosslinked polymeric binder. Suitable photo-crosslinked polymeric binders include, but are not limited to, polybenzophenones, polyacrylates, polyvinyls, polystyrenes, polysulfones, 2,3-dihydrofuran-containing polymers, styrene-containing copolymers, and mixtures thereof.

In certain embodiments, the polymeric binder is formed from its precursors via polymerization on the surface of the subparticles provided herein. In certain embodiments, the precursors of a polymer are monomers of the polymer. In certain embodiments, the polyamideimide as a polymeric binder is formed from a polyanhydride and a polyamine via polymerization on the surfaces of the subparticles. In certain embodiments, the polyimide as a polymeric binder is formed from a polyanhydride and a polyamine via polymerization on the surfaces of the subparticles. In certain embodiments, the precursors of a polymer are crosslinkable polymers. In certain embodiments, the polyamideimide as a polymeric binder is formed from a polyamideimide via crosslinking on the surface of the subparticles provided herein. In certain embodiments, the polyimide as a polymeric binder is formed from a polyimide via crosslinking on the surface of the subparticle provided herein.

In certain embodiments, the amount of the binder in the electroactive agglomerated particle is ranging from about 0.1% to about 30%, from about 0.5% to about 20%, from about 1% to about 15%, from about 1% to about 10%, from about 1% to about 5%, or from about 2% to about 10% of the weight of the electroactive agglomerated particle.

In certain embodiments, a conductive polymer is also added to the polymeric binder to increase the conductivity of the electroactive agglomerated particle. Suitable conductive polymers include, but are not limited to, polythiophene, poly(3-hexylthiophene), poly(2-acetylthiophene), polybenzothiopnene, poly(2,5-dimethylthiophene), poly(2-ethylthiophene), poly(3-carboxylic ethyl thiophene), polythiopheneacetonitrile, poly(3,4-ethylenedioxythiophene), polyisothianaphthene, polypyrrole, polyaniline, polyparaphenylene, and mixtures thereof. In certain embodiments, the conductive polymer is added to the polymeric binder in an amount ranging from about 1 to about 40%, from about 2 to about 20%, from about 3 to about 15%, or from about 5 to about 10% of the total weight of the polymeric binder and conductive polymer. In certain embodiments, the conductive polymer is added to the polymeric binder first before contacting with the electroactive agglomerated particle.

In one embodiment, the electroactive agglomerated particle provided herein comprises $LiFePO_4$ or $LiMnPO_4$ (type 1), and $LiNi_cCo_{1-c}O_2$ (type 2), wherein c is no less than 0 and no greater than 1; or ranging from about 0.05 to about 0.95, from about 0.1 to about 0.90, from about 0.2 to about 0.5, or from about 0.2 to about 0.4. In one embodiment, c is ranging from about 0.2 to about 0.5 or from about 0.2 to about 0.4, or about 0.3.

In another embodiment, the electroactive agglomerated particle provided herein comprises subparticles of $LiFePO_4$ or $LiMnPO_4$ (type 1), and subparticles of $LiNi_cCo_{1-c}O_2$ (type 2), wherein c is no less than 0 and no greater than 1; or ranging from about 0.05 to about 0.95, from about 0.1 to about 0.90, from about 0.2 to about 0.5, or from about 0.2 to about 0.4. In one embodiment, c is ranging from about 0.2 to about 0.5 or from about 0.2 to about 0.4, or about 0.3.

In yet another embodiment, the electroactive agglomerated particle provided herein comprises $LiFePO_4$ or $LiMnPO_4$, and $V_2O_5$.

In yet another embodiment, the electroactive agglomerated particle provided herein comprises subparticles of $LiFePO_4$ or $LiMnPO_4$ (type 1), and subparticles of $V_2O_5$ (type 2).

In yet another embodiment, the electroactive agglomerated particle provided herein comprises $LiFePO_4$ or $LiMnPO_4$, and $LiNi_{1-a-b}Al_aCo_bO_2$ (type 2), where a and b are each as defined herein.

In yet another embodiment, the electroactive agglomerated particle provided herein comprises subparticles of $LiFePO_4$ or $LiMnPO_4$ (type 1), and subparticles of $LiNi_{1-a-b}Al_aCo_bO_2$ (type 2), where a and b are each as defined herein.

In one embodiment, the electroactive agglomerated particle comprises from about 1 to about 99%, from about 30 to about 95%, from about 50 to about 90%, from about 60% to about 90%, from about 60% to about 80%, from about 65% to about 80%, from about 70% to about 80%, or from about 80% to 90% by weight of the first electroactive material; and from about 99 to about 1%, from about 70 to about 5%, from about 50 to about 10%, from about 40 to about 10%, from about 40 to about 20%, from about 35 to about 20%, from about 30 to about 20%, or from about 20 to about 10% by weight of the second electroactive material, with the proviso that the total is no greater than 100%.

In another embodiment, the electroactive agglomerated particle comprises from about 50 to about 90% by weight of the first electroactive material and from about 50 to about 10% by weight of the second electroactive material with the proviso that the total is no greater than 100%.

In yet another embodiment, the electroactive agglomerated particle comprises from about 60 to about 90% by weight of the first electroactive material and from about 40 to about 10% by weight of the second electroactive material with the proviso that the total is no greater than 100%.

In still another embodiment, the electroactive agglomerated particle comprises from about 60 to about 80% by weight of the first electroactive material and from about 40 to about 20% by weight of the second electroactive material with the proviso that the total is no greater than 100%.

In one embodiment, the electroactive agglomerated particle comprises from about 1 to about 99%, from about 30 to about 95%, from about 50 to about 90%, from about 60% to about 90%, from about 60% to about 80%, from about 65% to about 80%, from about 70% to about 80%, or from about 80% to 90% by weight of the subparticles (type 1) of the first electroactive material; and from about 99 to about 1%, from about 70 to about 5%, from about 50 to about 10%, from about 40 to about 10%, from about 40 to about 20%, from about 35 to about 20%, from about 30 to about 20%, or from about 20 to about 10% by weight of the subparticles (type 2) of the second electroactive material, with the proviso that the total is no greater than 100%.

In another embodiment, the electroactive agglomerated particle comprises from about 50 to about 90% by weight of the subparticles of the first electroactive material and from about 50 to about 10% by weight of the subparticles of the second electroactive material with the proviso that the total is no greater than 100%.

In yet another embodiment, the electroactive agglomerated particle comprises from about 60 to about 90% by weight of the subparticles of the first electroactive material and from about 40 to about 10% by weight of the subparticles of the second electroactive material with the proviso that the total is no greater than 100%.

In still another embodiment, the electroactive agglomerated particle comprises from about 60 to about 80% by weight of the subparticles of the first electroactive material and from about 40 to about 20% by weight of the subparticles of the second electroactive material with the proviso that the total is no greater than 100%.

In one embodiment, the electroactive agglomerated particle provided herein comprises $LiFePO_4$ or $LiMnPO_4$, $LiNi_cCo_{1-c}O_2$, and a binder, wherein c is as defined herein. In certain embodiments, the binder is coal tar. In certain embodiments, the binder is a polymeric binder. In certain embodiments, the binder is a crosslinkable polymer. In certain embodiments, the binder is a polyamideimide. In certain embodiments, the binder is a polyimide. In certain embodiments, the binder is carboxymethyl cellulose (CMC).

In another embodiment, the electroactive agglomerated particle provided herein comprises subparticles of $LiFePO_4$ or $LiMnPO_4$, subparticles of $LiNi_cCo_{1-c}O_2$, and a binder, wherein c is as defined herein. In certain embodiments, the binder is coal tar. In certain embodiments, the binder is a polymeric binder. In certain embodiments, the binder is a crosslinkable polymer. In certain embodiments, the binder is a polyamideimide. In certain embodiments, the binder is a polyimide. In certain embodiments, the binder is carboxymethyl cellulose (CMC).

In certain embodiments, the electroactive agglomerated particle provided herein comprises LiFePO$_4$ or LiMnPO$_4$, LiNi$_c$Co$_{1-c}$O$_2$, and coat tar, wherein c is as defined herein. In certain embodiments, the electroactive agglomerated particle provided herein comprises LiFePO$_4$ or LiMnPO$_4$, LiNi$_c$Co$_{1-c}$O$_2$, and a polyamideimide or polyimide, wherein c is as defined herein.

In certain embodiments, the electroactive agglomerated particle provided herein comprises subparticles of LiFePO$_4$ or LiMnPO$_4$, subparticles of LiNi$_c$Co$_{1-c}$O$_2$, and coat tar, wherein c is as defined herein. In certain embodiments, the electroactive agglomerated particle provided herein comprises subparticles of LiFePO$_4$ or LiMnPO$_4$, subparticles of LiNi$_c$Co$_{1-c}$O$_2$, and a polyamideimide or polyimide, wherein c is as defined herein.

In yet another embodiment, the electroactive agglomerated particle provided herein comprises LiFePO$_4$ or LiMnPO$_4$, V$_2$O$_5$, and a binder. In certain embodiments, the binder is coal tar. In certain embodiments, the binder is a polymeric binder. In certain embodiments, the binder is a crosslinkable polymer. In certain embodiments, the binder is a polyamideimide. In certain embodiments, the binder is a polyimide. In certain embodiments, the binder is carboxymethyl cellulose (CMC).

In yet another embodiment, the electroactive agglomerated particle provided herein comprises subparticles of LiFePO$_4$ or LiMnPO$_4$, subparticles of V$_2$O$_5$, and a binder. In certain embodiments, the binder is coal tar. In certain embodiments, the binder is a polymeric binder. In certain embodiments, the binder is a crosslinkable polymer. In certain embodiments, the binder is a polyamideimide. In certain embodiments, the binder is a polyimide. In certain embodiments, the binder is carboxymethyl cellulose (CMC).

In certain embodiments, the electroactive agglomerated particle provided herein comprises LiFePO$_4$ or LiMnPO$_4$, V$_2$O$_5$, and coat tar. In certain embodiments, the electroactive agglomerated particle provided herein comprises LiFePO$_4$ or LiMnPO$_4$, V$_2$O$_5$, and a polyamideimide or polyimide.

In certain embodiments, the electroactive agglomerated particle provided herein comprises subparticles of LiFePO$_4$ or LiMnPO$_4$, subparticles of V$_2$O$_5$, and coat tar. In certain embodiments, the electroactive agglomerated particle provided herein comprises subparticles of LiFePO$_4$ or LiMnPO$_4$, subparticles of V$_2$O$_5$, and a polyamideimide or polyimide.

In yet another embodiment, the electroactive agglomerated particle provided herein comprises LiFePO$_4$ or LiMnPO$_4$, LiNi$_{1-a-b}$Al$_a$Co$_b$O$_2$, and a binder, wherein a and b are each as defined herein. In certain embodiments, the binder is coal tar. In certain embodiments, the binder is a polymeric binder. In certain embodiments, the binder is a crosslinkable polymer. In certain embodiments, the binder is a polyamideimide. In certain embodiments, the binder is a polyimide. In certain embodiments, the binder is carboxymethyl cellulose (CMC).

In still another embodiment, the electroactive agglomerated particle provided herein comprises subparticles of LiFePO$_4$ or LiMnPO$_4$, subparticles of LiNi$_{1-a-b}$Al$_a$Co$_b$O$_2$, and a binder, wherein a and b are each as defined herein. In certain embodiments, the binder is coal tar. In certain embodiments, the binder is a polymeric binder. In certain embodiments, the binder is a crosslinkable polymer. In certain embodiments, the binder is a polyamideimide. In certain embodiments, the binder is a polyimide. In certain embodiments, the binder is carboxymethyl cellulose (CMC).

In certain embodiments, the electroactive agglomerated particle provided herein comprises LiFePO$_4$ or LiMnPO$_4$, LiNi$_{1-a-b}$Al$_a$Co$_b$O$_2$, and coat tar, wherein a and b are each as defined herein. In certain embodiments, the electroactive agglomerated particle provided herein comprises LiFePO$_4$, and LiNi$_{1-a-b}$Al$_a$Co$_b$O$_2$ or LiMnPO$_4$, and a polyamideimide or polyimide, wherein a and b are each as defined herein.

In certain embodiments, the electroactive agglomerated particle provided herein comprises subparticles of LiFePO$_4$ or LiMnPO$_4$, subparticles of LiNi$_{1-a-b}$Al$_a$Co$_b$O$_2$, and coat tar, wherein a and b are each as defined herein. In certain embodiments, the electroactive agglomerated particle provided herein comprises subparticles of LiFePO$_4$, subparticles of LiNi$_{1-a-b}$Al$_a$Co$_b$O$_2$ or LiMnPO$_4$, and a polyamideimide or polyimide, wherein a and b are each as defined herein.

In one embodiment, the electroactive agglomerated particle comprises from about 30 to about 95% by weight of the first electroactive material, from about 70 to about 5% by weight of the second electroactive material, and from about 0.1 to about 5% by weight of the binder(s). In another embodiment, the electroactive agglomerated particle comprises from about 50 to about 90% by weight of the first electroactive material and from about 50 to about 10% by weight of the second electroactive material, and from about 0.1 to about 5% by weight of the binder(s). In yet another embodiment, the electroactive agglomerated particle comprises from about 60 to about 90% by weight of the first electroactive material and from about 40 to about 10% by weight of the second electroactive material, and from about 0.1 to about 5% by weight of the binder(s). In yet another embodiment, the electroactive agglomerated particle comprises from about 70 to about 90% by weight of the first electroactive material and from about 30 to about 10% by weight of the second electroactive material, and from about 0.1 to about 5% by weight of the binder(s). Nevertheless, the total amount of all the ingredients in the agglomerates should equal to 100%.

In one embodiment, the electroactive agglomerated particle comprises from about 30 to about 95% by weight of the subparticles (type 1) of the first electroactive material, from about 70 to about 5% by weight of the subparticles (type 2) of the second electroactive material, and from about 0.1 to about 5% by weight of the binder(s). In another embodiment, the electroactive agglomerated particle comprises from about 50 to about 90% by weight of the subparticles (type 1) of the first electroactive material and from about 50 to about 10% by weight of the subparticles (type 2) of the second electroactive material, and from about 0.1 to about 5% by weight of the binder(s). In yet another embodiment, the electroactive agglomerated particle comprises from about 60 to about 90% by weight of the subparticles of the first electroactive material and from about 40 to about 10% by weight of the subparticles of the second electroactive material, and from about 0.1 to about 5% by weight of the binder(s). In yet another embodiment, the electroactive agglomerated particle comprises from about 70 to about 90% by weight of the subparticles of the first electroactive material and from about 30 to about 10% by weight of the subparticles of the second electroactive material, and from about 0.1 to about 5% by weight of the binder (s). Nevertheless, the total amount of all the ingredients in the agglomerates should equal to 100%.

In certain embodiments, the electroactive agglomerated particle provided herein is a micrometer-sized particle. Without being bound to any theory, such a micrometer-sized particle can increase the particle flowability, and manufacturability of end products, e.g., electrodes for a battery. In certain embodiments, the electroactive agglomerated particle has an average particle size ranging from about 0.1 to about 100 µm, from about 0.5 to about 50 µm, from about 0.5 to about 20 µm, from about 1 to about 20 µm, from about 1 to about 10 µm, from about 2 to about 20 µm, from about 2 to about 10 µm, from about 3 to about 10 µm, from about 5 to about 12 µm, from about 6 to about 10 µm, from about 1 to about 5 µm, from about 2 to about 5 µm, or from about 3 to about 5 µm. In certain embodiments, the electroactive agglomerated particle has an average particle size of about 1 µm, about 2 µm, about 3 µm, about 4 µm, about 5 µm, about 6 µm, about 7 µm, about 8 µm, about 9, or about 10 µm. In certain embodiments, the electroactive agglomerated particle has an average particle size of about 3 µm. In certain embodiments, the electroactive agglomerated particle has an average particle size of about 4 µm. In certain embodiments, the electroactive agglomerated particle has an average particle size of about 5 µm.

In certain embodiments, the electroactive agglomerated particle has an average surface area ranging from about 0.1 to about 100 $m^2/g$, from about 1 to about 50 $m^2/g$, from about 2 to about 20 $m^2/g$, from about 5 to about 20 $m^2/g$, from about 2 to about 15 $m^2/g$, from about 2 to about 10 $m^2/g$, or from about 10 to about 15 $m^2/g$.

In certain embodiments, the electroactive agglomerated particle is porous. In certain embodiments, the electroactive agglomerated particle has porosity as measured by density, ranging from about 0.1 to about 10 $g/cm^3$, from about 0.2 to about 5 $g/cm^3$, from about 0.5 to about 4 $g/cm^3$, or from about 1 to about 3 $g/cm^3$. In certain embodiments, the electroactive agglomerated particle has porosity of about 0.5, about 1, about 1.5, about 2, about 2.5, about 3, about 3.5, about 4, about, 4.5, or about 5 $g/cm^3$.

In certain embodiments, the electroactive agglomerated particles have such particle size distribution that 10% of the electroactive agglomerated particles have a particle size of about 0.05 µm, about 0.1 µm, or about 1 µm; and 90% of the electroactive agglomerated particles have a particle size of about 100 µm, about 50 µm, about 20 µm, about 10 µm, or about 5 µm. In certain embodiments, the electroactive agglomerated particles have such particle size distribution that 10% of the electroactive agglomerated particles have a particle size of 1 µm and 90% of the electroactive agglomerated particles have a particle size of 10 µm.

In certain embodiments, the electroactive agglomerated particle has a particle size ranging from about 100 nm to about 500 µm, from about 200 nm to about 200 µm, from about 500 nm to about 100 µm, from about 1 to about 50 µm, from about 10 to about 50 µm, from about 10 to about 40 µm, from about 10 to about 30 µm, or from about 10 to about 20 µm. In certain embodiments, the electroactive agglomerated particle has a particle size in the range from about 1 to about 50 µm.

In certain embodiments, the electroactive agglomerated particle is coated to provide additional desired chemical and/or physical properties, such as chemical inertness (by coating with metal oxides, such as $TiO_2$, $MoO_3$, $WO_3$, $Al_2O_3$, or ZnO) or electrical conductivity (by coating with, e.g., ionic conductors or carbon). In certain embodiments, the electroactive agglomerated particle is coated with a metal oxide by contacting the electroactive agglomerated particle with the metal oxide, e.g., in a grinder. In certain embodiments, the electroactive agglomerated particle is coated with a metal oxide by contacting the electroactive agglomerated particle with a solution of polytitanic acid, polytungstic acid, polymolybdic acid, polytitanic acid peroxide, polytungstic acid peroxide, polymolybdic acid peroxide, or a mixture thereof, to form the corresponding metal oxide upon dehydration.

In certain embodiments, the electroactive agglomerated particle is coated with carbon by thermal vapor deposition (CVD), as described in U.S. Pat. App. Pub. No. 2003/025711, the disclosure of which is incorporated herein by reference in its entirety.

In certain embodiments, the electroactive agglomerated particle provided herein comprises from about 30 to about 95% by weight of the subparticles of the first electroactive material and from about 70 to about 5% by weight of the subparticles of the second electroactive material, with the proviso that the total is no greater than 100%.

In certain embodiments, the electroactive agglomerated particle provided herein comprises from about 30 to about 95% by weight of the first electroactive material and from about 70 to about 5% by weight of the second electroactive material, with the proviso that the total is no greater than 100%.

In certain embodiments, the electroactive agglomerated particle provided herein comprises from about 30 to about 95% by weight of the first electroactive material, from about 70 to about 5% by weight of the second electroactive material, and from about 0.1 to about 5% by weight of the binder; with the proviso that the total is no greater than 100%.

In certain embodiments, the electroactive agglomerated particle provided herein comprises from about 30 to about 95% by weight of the subparticles of the first electroactive material, from about 70 to about 5% by weight of the subparticles of the second electroactive material, and from about 0.1 to about 5% by weight of the binder; with the proviso that the total is no greater than 100%.

In certain embodiments, the electroactive agglomerated particle provided herein comprises from about 30 to about 95% by weight of $LiFePO_4$ or $LiMnPO_4$, and from about 70 to about 5% by weight of $LiNi_{1-a-b}Al_aCo_bO_2$, with the proviso that the total is no greater than 100%; where a and b are each as defined herein.

In certain embodiments, the electroactive agglomerated particle provided herein comprises from about 30 to about 95% by weight of $LiFePO_4$ or $LiMnPO_4$ subparticles and from about 70 to about 5% by weight of $LiNi_{1-a-b}Al_aCo_bO_2$ subparticles, with the proviso that the total is no greater than 100%; where a and b are each as defined herein.

In certain embodiments, the electroactive agglomerated particle provided herein comprises $LiFePO_4$ or $LiMnPO_4$, $LiNi_{1-a-b}Al_aCo_bO_2$, and at least one diluent, where a and b are each as defined herein; wherein the diluent is selected from the group consisting of carbon nanoparticles, in one embodiment, graphite nanoparticle, disordered carbon nanoparticle, carbon nanotubes (SWNTs or MWNTs), and carbon nanofibers; Al subparticles, Ti subparticles, and mixtures thereof. In one embodiment, the diluent is a carbon nanoparticle.

In certain embodiments, the electroactive agglomerated particle provided herein comprises $LiFePO_4$ or $LiMnPO_4$ subparticles, $LiNi_{1-a-b}Al_aCo_bO_2$ subparticles, and at least one diluent subparticle, where a and b are each as defined herein; wherein the diluent subparticle is selected from the group consisting of carbon nanoparticles, in one embodiment, graphite nanoparticle, disordered carbon nanoparticle, carbon nanotubes (SWNTs or MWNTs), and carbon nanofibers; Al subparticles, Ti subparticles, and mixtures thereof. In one embodiment, the diluent subparticle is a carbon nanoparticle.

In certain embodiments, the electroactive agglomerated particle provided herein comprises from about 30 to about 95% by weight of $LiFePO_4$ or $LiMnPO_4$, from about 70 to about 5% by weight of $LiNi_{1-a-b}Al_aCo_bO_2$, and from about 0.1 to about 5% by weight of carbon; with the proviso that the total is no greater than 100%; where a and b are each as defined herein.

In certain embodiments, the electroactive agglomerated particle provided herein comprises from about 30 to about 95% by weight of $LiFePO_4$ or $LiMnPO_4$ subparticles, from about 70 to about 5% by weight of $LiNi_{1-a-b}Al_aCo_bO_2$ subparticles, and from about 0.1 to about 5% by weight of carbon subparticles; with the proviso that the total is no greater than 100%; where a and b are each as defined herein.

In certain embodiments, the electroactive agglomerated particle provided herein comprises from about 60 to about 90% by weight of $LiFePO_4$ or $LiMnPO_4$, from about 40 to about 10% by weight of $LiNi_{1-a-b}Al_aCo_bO_2$, and from about 0.1 to about 5% by weight of carbon; with the proviso that the total is no greater than 100%; where a and b are each as defined herein.

In certain embodiments, the electroactive agglomerated particle provided herein comprises from about 60 to about 90% by weight of $LiFePO_4$ or $LiMnPO_4$ subparticles, from about 40 to about 10% by weight of $LiNi_{1-a-b}Al_aCo_bO_2$ subparticles, and from about 0.1 to about 5% by weight of carbon subparticles; with the proviso that the total is no greater than 100%; where a and b are each as defined herein.

In certain embodiments, the electroactive agglomerated particle provided herein comprises from about 65 to about 80% by weight of $LiFePO_4$ or $LiMnPO_4$, from about 35 to about 20% by weight of $LiNi_{1-a-b}Al_aCo_bO_2$, and from about 1 to about 2% by weight of carbon; with the proviso that the total is no greater than 100%; where a and b are each as defined herein.

In certain embodiments, the electroactive agglomerated particle provided herein comprises from about 65 to about 80% by weight of $LiFePO_4$ or $LiMnPO_4$ subparticles, from about 35 to about 20% by weight of $LiNi_{1-a-b}Al_aCo_bO_2$ subparticles, and from about 1 to about 2% by weight of carbon subparticles; with the proviso that the total is no greater than 100%; where a and b are each as defined herein.

In certain embodiments, the electroactive agglomerated particle provided herein comprises from about 30 to about 95% by weight of the first electroactive material, from about 70 to about 5% by weight of the second electroactive material, and from about 0.1 to about 5% by weight of the binder; with the proviso that the total is no greater than 100%.

In certain embodiments, the electroactive agglomerated particle provided herein comprises from about 30 to about 95% by weight of the subparticles of the first electroactive material, from about 70 to about 5% by weight of the subparticles of the second electroactive material, and from about 0.1 to about 5% by weight of the binder; with the proviso that the total is no greater than 100%.

In certain embodiments, the electroactive agglomerated particle provided herein comprises from about 30 to about 95% by weight of $LiFePO_4$, from about 70 to about 5% by weight of $LiNi_{1-a-b}Al_aCo_bO_2$, and from about 0.1 to about 5% by weight of the binder; with the proviso that the total is no greater than 100%; where a and b are each as defined herein.

In certain embodiments, the electroactive agglomerated particle provided herein comprises from about 30 to about 95% by weight of $LiFePO_4$ subparticles, from about 70 to about 5% by weight of $LiNi_{1-a-b}Al_aCo_bO_2$ subparticles, and from about 0.1 to about 5% by weight of the binder; with the proviso that the total is no greater than 100%; where a and b are each as defined herein.

In certain embodiments, the electroactive agglomerated particle provided herein comprises about 70% by weight of $LiFePO_4$, about 30% by weight of $LiNi_{1-a-b}Al_aCo_bO_2$, and about 1% by weight of a binder; with the proviso that the total is no greater than 100%; where a and b are each as defined herein.

In certain embodiments, the electroactive agglomerated particle provided herein comprises about 70% by weight of $LiFePO_4$ subparticles, about 30% by weight of $LiNi_{1-a-b}Al_aCo_bO_2$ subparticles, and about 1% by weight of a binder; with the proviso that the total is no greater than 100%; where a and b are each as defined herein.

In certain embodiments, a is 0.05 and b is 0.15. In certain embodiments, a is 0.03 and b is 0.17. In certain embodiments, the second electroactive material is $LiAl_{0.05}Ni_{0.8}Co_{0.15}O_2$.

In certain embodiments, the binder is a polyimide. In certain embodiments, the binder is a polyamideimide. In certain embodiments, the binder is CMC.

In one embodiment, the electroactive agglomerated particle provided herein comprises about 78% by weight of $LiFePO_4$, about 20% by weight of $LiAl_{0.05}Ni_{0.8}Co_{0.15}O_2$, and about 1.5% by weight of carbon.

In another embodiment, the electroactive agglomerated particle provided herein comprises about 68% by weight of $LiFePO_4$, about 30% by weight of $LiAl_{0.05}Ni_{0.8}Co_{0.15}O_2$, and about 1.2% by weight of carbon.

In yet another embodiment, the electroactive agglomerated particle provided herein comprises about 78% by weight of subparticles of $LiFePO_4$, about 20% by weight of subparticles of $LiAl_{0.05}Ni_{0.8}Co_{0.15}O_2$, and about 1.5% by weight of carbon.

In yet another embodiment, the electroactive agglomerated particle provided herein comprises about 68% by weight of subparticles of $LiFePO_4$, about 30% by weight of subparticles of $LiAl_{0.05}Ni_{0.8}Co_{0.15}O_2$, and about 1.2% by weight of carbon.

In yet another embodiment, the electroactive agglomerated particle provided herein comprises about 69% by weight of $LiFePO_4$, about 30% by weight of $LiAl_{0.05}Ni_{0.8}Co_{0.15}O_2$, and about 1% by weight of polyamideimide.

In yet another embodiment, the electroactive agglomerated particle provided herein comprises about 69% by weight of subparticles of $LiFePO_4$, about 30% by weight of subparticles of $LiAl_{0.05}Ni_{0.8}Co_{0.15}O_2$, and about 1% by weight of polyamideimide.

In yet another embodiment, the electroactive agglomerated particle provided herein comprises about 69% by weight of $LiFePO_4$, about 30% by weight of $LiAl_{0.05}Ni_{0.8}Co_{0.15}O_2$, and about 1% by weight of CMC.

In yet another embodiment, the electroactive agglomerated particle provided herein comprises about 69% by weight of subparticles of $LiFePO_4$, about 30% by weight of subparticles of $LiAl_{0.05}Ni_{0.8}Co_{0.15}O_2$, and about 1% by weight of CMC.

Without being bound to any theory, one advantage of the electroactive agglomerated particle is that the electroactive particle can be used to make electrodes using conventional processing techniques, such as reverse roll coating or doctor blade coating. Without being bound to any theory, another advantage is that one of the two electroactive materials in the electroactive agglomerated particle can enhance the electrical or ionic conductivity of the other without reducing specific capacity. For example, with the electroactive agglomerated particle comprising $LiFePO_4$ and $LiAlNiCoO_2$ subparticles, the voltage behaviors of both the $LiFePO_4$ and $LiAlNiCoO_2$ materials are retained, so that the electroactive agglomerated particle behaves as a superposition of the two.

Electroactive Subparticles

In one embodiment, the first electroactive material is a lithium compound. In one embodiment, the first electroactive material is a lithium phosphate compound. In another embodiment, the first electroactive material is $LiMPO_4$, wherein M is a transition metal. In yet another embodiment, M is a transition metal selected from the group consisting of Ti, V, Cr, Mn, Fe, Co, and Ni. In yet another embodiment, the first electroactive material is $LiFePO_4$. In yet another embodiment, the first electroactive material is $LiMnPO_4$. In yet another embodiment, the first electroactive material is $LiVPO_4$. In yet another embodiment, the first electroactive material is $AM^a_{1-d}M^b_dPO_4$, wherein A is Li, Na, or a mixture thereof; $M^a$ is Fe, Co, Mn, or a mixture thereof; $M^b$ is Mg, Ca, Zn, Ni, Co, Cu, Al, B, Cr, Nb, or a mixture thereof; and d is ranging from about 0.01 to about 0.99, from about 0.01 to about 0.5, from about 0.01 to about 0.30, or from about 0.01 to about 0.15. In yet another embodiment, the first electroactive material is $LiM^a_{1-d}M^b_dPO_4$, wherein $M^a$, $M^b$, and d are each as defined herein. In yet another embodiment, the first electroactive material is $NaM^a_{1-d}M^b_dPO_4$, wherein $M^a$, $M^b$, and d are each as defined herein. In still another embodiment, the first electroactive material is $(LiF)_xFe_{1-x}$, where $0<x<1$, in one embodiment, x is 0.5.

In another embodiment, the second electroactive material is a metal oxide. In one embodiment, the second electroactive material is selected from the group consisting of $LiCoO_2$, $LiNiCoO_2$, $LiNi_cCo_{1-c}O_2$, wherein c is from about 0.05 to about 0.95, from about 0.1 to about 0.90, from about 0.2 to about 0.5, or from about 0.2 to about 0.4, $Li(NiMnCo)_{1/3}O_2$, $Li(NiMn)_{1/2}O_2$, $LiV_2O_5$, and mixtures thereof. In yet another embodiment, the second electroactive material is $LiCoO_2$. In yet another embodiment, the second electroactive material is $LiNiCoO_2$. In still another embodiment, the second electroactive material is $LiMn_2O_4$.

In yet another embodiment, the second electroactive material is $LiNi_cCo_{1-c}O_2$, wherein c is ranging from about 0.05 to about 0.95, from about 0.1 to about 0.90, from about 0.2 to about 0.5, or from about 0.2 to about 0.4. In yet another embodiment, the second electroactive material is $LiNi_cCo_{1-c}O_2$, wherein c is from about 0.2 to about 0.5, from about 0.2 to about 0.4, or about 0.3. In yet another embodiment, the second electroactive material is $Li(NiMnCo)_{1/3}O_2$. In yet another embodiment, the second electroactive material is $Li(NiMn)_{1/2}O_2$. In yet another embodiment, the second electroactive material is $LiV_2O_5$.

In yet another embodiment, the second electroactive material is $LiNi_eMn_fCo_{1-e-f}O_2$, wherein e and f are each independently ranging from 0 to about 0.95, from about 0.01 to about 0.9, from about 0.05 to about 0.80, from about 0.1 to about 0.5, or from about 0.2 to about 0.4, and the sum of e and f is less than 1. In yet another embodiment, the second electroactive material is $LiNi_eMn_fCo_{1-e-f}O_2$, wherein e and f are 0.33.

In still another embodiment, the second electroactive material is $LiNi_{1-a-b}Al_aCo_bO_2$, wherein a is from about 0.01 to about 0.9, from about 0.01 to about 0.7, from about 0.01 to about 0.5, from about 0.01 to about 0.4, from about 0.01 to about 0.3, from about 0.01 to about 0.2, or from about 0.01 to about 0.1; and b is from about 0.01 to about 0.9, from about 0.01 to about 0.7, from about 0.01 to about 0.5, from about 0.01 to about 0.4, from about 0.01 to about 0.3, from about 0.01 to about 0.2, or from about 0.01 to about 0.1; with the proviso that the sum of a and b is less than 1. In certain embodiments, a is from about 0.01 to about 0.5. In certain embodiments, a is from about 0.01 to about 0.1. In certain embodiments, b is from about 0.01 to about 0.9. In certain embodiments, b is from about 0.01 to about 0.2. In certain embodiments, a is from about 0.01 to about 0.1 and b is from about 0.01 to about 0.2. In certain embodiments, the second electroactive material is $LiAlNiCoO_2$. In certain embodiments, the second electroactive material is $LiAl_{0.05}Ni_{0.8}Co_{0.15}O_2$. In certain embodiments, the second electroactive material is $LiAl_{0.03}Ni_{0.8}Co_{0.17}O_2$.

Each type of the electroactive subparticles used herein can have various shapes, including, but not limited to, sphere, spheroid, fibril, fiber, or platelet. In certain embodiments, the electroactive subparticles used herein are substantially spherical. In certain embodiments, the electroactive subparticles used herein are spherical. In certain embodiments, the electroactive subparticles used herein are spheroidal.

In certain embodiments, each type of the electroactive subparticles in the electroactive agglomerated particles independently has an average particle size ranging from about 1 to about 500 nm, from about 1 to about 200 nm, or from about 2 to about 100 nm. In certain embodiments, each type of the electroactive subparticles in the electroactive agglomerated particles independently has an average particle size of about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, or about 150 nm.

In certain embodiments, at least one type of the electroactive subparticles used herein is coated to provide additional desired chemical and/or physical properties, such as chemical inertness (by coating with metal oxides, such as $TiO_2$, $MoO_3$, $WO_3$, $Al_2O_3$, or ZnO) or electrical conductivity (by coating with, e.g., ionic conductors or carbon). In certain embodiments, at least one type of the electroactive subparticles used herein is coated with a metal oxide by mixing the electroactive subparticles with the metal oxide, e.g., in a grinder. In certain embodiments, at least one type of the electroactive subparticles used herein is coated with a metal oxide by mixing the electroactive subparticles with a solution of polytitanic acid, polytungstic acid, polymolybdic acid, polytitanic acid peroxide, polytungstic acid peroxide, or polymolybdic acid peroxide, which forms the corresponding metal oxide upon dehydration.

In certain embodiments, at least one type of the electroactive subparticles used herein is coated with a carbonized carbon layer. In certain embodiments, at least one type of the electroactive subparticles used herein is first treated with a binder, including, but not limited to, asphalt pitch, pitch coke, petroleum coke, a sugar, coal tar, fluoranthene, pyrene, chrysene, phenanthrene, anthracene, naphthalin, fluorine, biphenyl, acenephthene, or a mixture thereof; and subsequently carbonized, in one embodiment, in an inert gas atmosphere, to form carbonized carbon layer on the surface of the electroactive subparticles.

In certain embodiments, at least one type of the electroactive subparticles used herein is coated with carbon by thermal vapor deposition (CVD), as described in U.S. Pat. App. Pub. No. 2003/025711, the disclosure of which is incorporated herein by reference in its entirety.

Polymeric Overcoating

In one embodiment, the polymeric overcoating is an organic polymer. Suitable polymeric overcoatings include, but are not limited to, polyamideimides, polyimides, polytetrafluoroethylene (PTFE), carboxymethyl cellulose (CMC), polyvinylidene fluoride (PVDF), polyvinyl alcohol (PVA), styrene butadiene rubber (SBR), and mixtures thereof. In certain embodiments, the polymeric overcoating is a polyamideimide. In certain embodiments, the polymeric overcoating is a polyimide. In certain embodiments, the polymeric overcoating is a carboxymethyl cellulose.

In certain embodiments, the polymeric overcoating material is a crosslinkable polymer. Suitable crosslinkable polymers include, but are not limited to, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In certain embodiments, the crosslinkable polymer is a polyamideimide. In certain embodiments, the crosslinkable polymer is a polyimide. In certain embodiments, the crosslinkable polymer is a carboxymethyl cellulose.

In certain embodiments, the polymeric overcoating material is a crosslinked polymer. Suitable crosslinked polymers include, but are not limited to, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In certain embodiments, the crosslinked polymer is a polyamideimide. In certain embodiments, the crosslinked polymer is a polyimide. In certain embodiments, the crosslinked polymer is a carboxymethyl cellulose.

In certain embodiments, the polymeric overcoating is a thermally crosslinkable polymer. Suitable thermally crosslinkable polymers include, but are not limited to, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In certain embodiments, the thermally crosslinkable polymer is a polyamideimide. In certain embodiments, the thermally crosslinkable polymer is a polyimide. In certain embodiments, the thermally crosslinkable polymer is a carboxymethyl cellulose.

In certain embodiments, the polymeric overcoating is a thermally crosslinked polymer. Suitable thermally crosslinked polymers include, but are not limited to, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In certain embodiments, the thermally crosslinked polymer is a polyamideimide. In certain embodiments, the thermally crosslinked polymer is a polyimide. In certain embodiments, the thermally crosslinked polymer is a carboxymethyl cellulose.

In certain embodiments, the polymeric overcoating is a photo crosslinkable polymer. Suitable photo crosslinkable polymers include, but are not limited to, polybenzophenones, polyacrylates, polyvinyls, polystyrenes, polysulfones, 2,3-dihydrofuran-containing polymers, styrene-containing copolymers, and mixtures thereof.

In certain embodiments, the polymeric overcoating is a photo crosslinked polymer. Suitable photo crosslinked polymers include, but are not limited to, polybenzophenones, polyacrylates, polyvinyls, polystyrenes, polysulfones, 2,3-dihydrofuran-containing polymers, styrene-containing copolymers, and mixtures thereof.

In certain embodiments, the polymeric overcoating is formed from its precursors via polymerization on the surface of the core of the coated electroactive particle provided herein. In certain embodiments, the precursors of a polymer are monomers of the polymer. In certain embodiments, the precursors of a polymer are crosslinkable polymers. In certain embodiments, the polyamideimide as a polymeric overcoating is formed from a polyamideimide via crosslinking on the surface of the core of the coated electroactive particle provided herein. In certain embodiments, the polyimide as a polymeric overcoating is formed from a polyimide via crosslinking on the surface of the core of the coated electroactive particle provided herein.

In one embodiment, the polymeric overcoating is a polyamideimide, polyimide, or a mixture thereof. In certain embodiments, the polyamideimide is aromatic, aliphatic, cycloaliphatic, or a mixture thereof. In certain embodiments, the polyamideimide is an aromatic polyamideimide. In certain embodiments, the polyamideimide is an aliphatic polyamideimide. In certain embodiments, the polyamideimide is a cycloaliphatic polyamideimide. In certain embodiments, the polyimide is aromatic, aliphatic, cycloaliphatic, or a mixture thereof. In certain embodiments, the polyimide is an aromatic polyimide. In certain embodiments, the polyimide is an aliphatic polyimide. In certain embodiments, the polyimide is a cycloaliphatic polyimide.

In certain embodiments, the polymeric overcoating is TORLON® AI-30, TORLON® AI-50, TORLON® 4000, or TORLON® 4203L (Solvay Advanced Polymers, L.L.C., Ao0yaretta, GA); or formed from U-VARNISH® (UBE American Inc., New York, N.Y.). In certain embodiments, the polymeric overcoating is TORLON® AI-30. In certain embodiments, the polymeric overcoating is TORLON® AI-50. In certain embodiments, the polymeric overcoating is TORLON® 4000. In certain embodiments, the polymeric overcoating is TORLON® 4203L. In certain embodiments, the polymeric overcoating is a polyimide formed from U-VARNISH® (UBE American Inc., New York, N.Y.).

Some other suitable polyamideimide and polyimides include those described in Loncrini and Witzel, *Journal of Polymer Science Part A-1: Polymer Chemistry* 1969, 7, 2185-2193; Jeon and Tak, *Journal of Applied Polymer Science* 1996, 60, 1921-1926; Seino et al., *Journal of Polymer Science Part A: Polymer Chemistry* 1999, 37, 3584-3590; Seino et al., *High Performance Polymers* 1999, 11, 255-262; Matsumoto, *High Performance Polymers* 2001, 13, S85-S92; Schab-Balcerzak et al., *European Polymer Journal* 2002, 38, 423-430; Eichstadt et al., *Journal of Polymer Science Part B: Polymer Physics* 2002, 40, 1503-1512; and Fang et al., *Polymer* 2004, 45, 2539-2549, the disclosure of each of which is incorporated herein by reference in its entirety.

In certain embodiments, the polyamideimide as a polymeric overcoating is formed from a polyanhydride and a polyamine via polymerization on the surface of the core of the coated electroactive particle provided herein.

In certain embodiments, the polyimide as a polymeric overcoating is formed from a polyanhydride and a polyamine via polymerization on the surface of the core of the coated electroactive particle provided herein.

In certain embodiments, the aromatic, aliphatic, or cycloaliphatic polyamideimide overcoating is formed via a condensation reaction of an aromatic, aliphatic, or cycloaliphatic polyanhydride, in one embodiment, a dianhydride, with an aromatic, aliphatic, or cycloaliphatic polyamine, in one embodiment, a diamine or triamine.

In certain embodiments, the aromatic, aliphatic, or cycloaliphatic polyimide overcoating is formed via a condensation reaction of an aromatic, aliphatic, or cycloaliphatic polyanhydride, in one embodiment, a dianhydride, with an aromatic, aliphatic, or cycloaliphatic polyamine, in one embodiment, a diamine or triamine, to form a polyamic acid; followed by chemical or thermal cyclization to form the polyimide.

Suitable polyanhydrides, polyamines, polyamideimide, and polyimides include those described in Eur. Pat. App. Pub. Nos. EP 0450549 and EP 1246280; U.S. Pat. No. 5,504,128; and U.S. Pat. Appl. Pub. Nos. 2006/0099506 and 2007/

0269718, the disclosure of each of which is incorporated herein by reference in its entirety.

Suitable polyanhydrides include, but are not limited to, butanetetracarboxylic dianhydride, meso-1,2,3,4-butanetetracarboxylic dianhydride, dl-1,2,3,4-butanetetracarboxylic dianhydride, cyclobutane tetracarboxylic dianhydride, 1,2,3,4-cyclopentane tetracarboxylic dianhydride, cyclohexane tetracarboxylic dianhydride, 1,2,3,4-cyclohexanetetracarboxylic dianhydride, cis-1,2,3,4-cyclohexanetetracarboxylic dianhydride, trans-1,2,3,4-cyclohexanetetracarboxylic dianhydride, bicyclo[2.2.2]octane-2,3,5,6-tetracarboxylic 2,3:5,6-dianhydride, bicyclo[2.2.2]oct-7-ene-2,3,5,6-tetracarboxylic dianhydride, bicyclo[2.2.1]-heptane-2,3,5,6-tetracarboxylic 2,3:5,6-dianhydride, (4arH,8acH)-decahydro-1,t,4t:5c,4-cyclohexene-1,1,2,2-tetracarboxylic 1,2:1,2-dianhydride, bicyclo[2.2.1]heptane-2-exo-3-exo-5-exo-tricarboxyl-5-endo-acetic dianhydride, bicyclo[4.2.0]oxetane-1,6,7,8-tetracarboxylic acid intramolecular dianhydride, 3,3',4,4'-diphenylsulfonetetracarboxylic dianhydride, 4,4'-hexafluoropropylidene bisphthalic dianhydride, 1,3-bis(3,4-dicarboxyphenyl)-1,1,3,3-tetramethyldisiloxane, and combinations thereof.

Suitable polyamines include, but are not limited to 4,4'-methylenebis(2,6-dimethylaniline), 4,4'-oxydianiline, m-phenylenediamine, p-phenylenediamine, benzidene, 3,5-diaminobenzoic acid, o-dianisidine, 4,4'-diaminodiphenyl methane, 4,4'-methylenebis(2,6-dimethylaniline), 1,4-diaminobutane, 1,6-diaminohexane, 1,7-diaminoheptane, 1,9-diaminononane, 1,10-diaminodecane, 1,12-diaminododecane, 5-amino-1,3,3-trimethylcyclohexanemethylamine, 2,5-bis(aminomethyl)bicyclo[2.2.1]heptane, 2,6-bis(aminomethyl)bicyclo[2.2.1]heptane, 2,4-diaminotoluene, 1,4-diamino-2-methoxybenzene, 1,4-diamino-2-phenylbenzene and 1,3-diamino-4-chlorobenzene, 4,4'-diaminobiphenyl, 2,2-bis(4-aminophenyl)propane, 2,2-bis[4-(4-aminophenoxy)phenyl]propane, 2,2-bis(4-aminophenyl)-1,1,1,3,3,3-hexafluoropropane, 2,2-bis(4-aminophenoxyphenyl)hexafluoropropane, 4,4'-diaminodiphenyl ether, 3,4-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, naphthalene diamines (including 1,8-diaminonaphthalene and 1,5-diaminonaphthalene), 2,6-diaminopyridine, 2,4-diaminopyrimidine, 2,4-diamino-s-triazine, 1,8-diamino-4-(aminomethyl)octane, bis[4-(4-aminophenoxy)-phenyl]sulfone, 3,3'-dihydroxy-4,4'-diaminobiphenyl, 2,2-bis(3-amino-4-hydroxyphenyl)hexafluoropropane, 2,2-bis(3-hydroxy-4-aminophenyl)propane, and combinations thereof.

In certain embodiments, the polyimide is poly(4,4'-phenyleneoxyphenylene pyromellitic imide) or poly(4,4'-phenyleneoxyphenylene-co-1,3-phenylene-benzophenonetetracarboxylic diimide).

In certain embodiments, a conductive polymer is also added to the polymeric overcoating to increase the conductivity of the coated electroactive particle. Suitable conductive polymers include, but are not limited to, polythiophene, poly(3-hexylthiophene), poly(2-acetylthiophene), polybenzothiopnene, poly(2,5-dimethylthiophene), poly(2-ethylthiophene), poly(3-carboxylic ethyl thiophene), polythiopheneacetonitrile, poly(3,4-ethylenedioxythiophene), polyisothianaphthene, polypyrrole, polyaniline, and polyparaphenylene. In certain embodiments, the conductive polymer is added to the overcoating polymer or precursors in an amount ranging from about 1 to about 40%, from about 2 to about 20%, from about 3 to about 15%, or from about 5 to about 10% of the total weight of the polymeric overcoating polymer and the conductive polymer. In certain embodiments, the conductive polymer is added to the overcoating polymer or precursors first before contacting with the electroactive agglomerated particles or the subparticles.

Methods of Preparation a. Electroactive Agglomerated Particles

In one embodiment, provided herein is a method for preparing the electroactive agglomerated particles provided herein, which comprises mixing subparticles of a first electroactive material and subparticles of a second electroactive material to form the electroactive agglomerated particles. The mixing step can be performed using any conventional method known to one of ordinary skill in the art, including, but not limited to, ball mixing, and cospraying, such as thermal spraying and ultrasonic spraying. The production method will depend on the nature of the subparticles employed.

In another embodiment, the method further comprises heating the electroactive agglomerated particles at an elevated temperature. In certain embodiments, the elevated temperature is ranging from about 200 to about 1000° C., from about 250 to about 750° C., from about 250 to about 700° C., from about 250 to about 600° C., from about 250 to about 500° C., or from about 250 to about 400° C.

In one embodiment, the electroactive agglomerated particles provided herein, which comprise $LiFePO_4$ subparticles, metal oxide subparticles, and coal tar, are prepared by mixing $LiFePO_4$ and metal oxide subparticles together; contacting the subparticle mixture with a coal tar fume, and ball mixing the subparticle mixture.

In another embodiment, the electroactive agglomerated particles provided herein, which comprise $LiFePO_4$ subparticles, metal oxide subparticles, coal tar, and carbon black, are prepared by mixing $LiFePO_4$ and metal oxide subparticles together, contacting the subparticle mixture with a coal tar fume and carbon black, and ball mixing the subparticle mixture.

In yet another embodiment, the electroactive agglomerated particles provided herein, which comprise $LiFePO_4$ subparticles, metal oxide subparticles, metal subparticles (such as Al, Ti, or Cr), and coal tar, are prepared by mixing $LiFePO_4$ subparticles, metal oxide subparticles, and metal subparticles together, contacting the subparticle mixture with coal tar fume, and ball mixing the subparticle mixture.

In yet another embodiment, microsized agglomerates of $LiFePO_4$ subparticles and metal oxide subparticles, and coal tar, are prepared by air-injecting $LiFePO_4$ subparticles, metal oxide subparticles, and coal tar, independently and simultaneously, from three tubes into a flowing bed.

In yet another embodiment, the electroactive agglomerated particles provided herein, which comprise $LiFePO_4$ subparticles, metal oxide subparticles, and coal tar, are prepared by air-injecting $LiFePO_4$ subparticles, and coal tar, independently and simultaneously, from three tubes into a flowing bed.

In yet another embodiment, the electroactive agglomerated particles provided herein, which comprise $LiFePO_4$ subparticles, metal oxide subparticles, coal tar, and carbon black, are prepared by air-injecting $LiFePO_4$ subparticles, metal oxide subparticles, coal tar, and carbon black, independently and simultaneously, from four tubes into a flowing bed.

In still another embodiment, the electroactive agglomerated particles provided herein, which comprise $LiFePO_4$ subparticles, metal oxide subparticles, metal subparticles (such as Al, Ti, or Cr), and coal tar, are prepared by air-injecting $LiFePO_4$ subparticles, metal oxide subparticles, metal subparticles, and coal tar, independently and simultaneously, from four tubes into a flowing bed.

The certain embodiments, the methods provided herein further comprise the step of grinding the coated electroactive particles into predetermined particle sizes.

b. Coated Electroactive Particles

In one embodiment, provided herein is a method for preparing the coated electroactive particles provided herein, which comprises the steps of: i) covering the surfaces of the electroactive agglomerated particles provided herein with a layer of a polymer in a solvent; and ii) curing the electroactive agglomerated particles at an elevated temperature to form the coated electroactive particles. In certain embodiments, the polymer is a crosslinkable polymer. In certain embodiments, the polymer is a polyamideimide. In certain embodiments, the polymer is a polyimide.

In another embodiment, provided herein is a method for preparing the coated electroactive particles provided herein, which comprises the steps of: i) covering the surfaces of electroactive agglomerated particles provided herein with a layer of a mixture of precursors of a polymer in a solvent; and ii) curing the electroactive agglomerated particles at an elevated temperature form the coated electroactive particles. In certain embodiments, the polymer is a crosslinked polymer. In certain embodiments, the polymer is a crosslinkable polymer. In certain embodiments, the precursors are crosslinkable polymers. In certain embodiments, the precursors are monomers. In certain embodiments, the polymer is a polyamideimide. In certain embodiments, the polymer is a polyimide. In certain embodiments, the precursors are crosslinkable polyamideimides. In certain embodiments, the precursors are crosslinkable polyimides. In certain embodiments, the precursors are a polyanhydride and polyamine.

In yet another embodiment, provided herein is a method for preparing the coated electroactive particles provided herein, which comprises the steps of: i) mixing electroactive agglomerated particles provided herein with a polymer in a solvent to form a slurry; ii) air-injecting the slurry to form particles; and iii) curing the particles from step ii) at an elevated temperature to form the coated electroactive particles. In certain embodiments, the polymer is a crosslinkable polymer. In certain embodiments, the polymer is a polyamideimide. In certain embodiments, the polymer is a polyimide. In certain embodiments, the solid content in the slurry is ranging from about 10 to about 90% by weight, from about 20 to about 90% by weight, from about 30 to about 70% by weight, or from about 40 to about 60% by weight. In certain embodiments, the solid content in the slurry is about 10% by weight, about 20% by weight, about 30% by weight, about 35% by weight, about 40% by weight, about 45% by weight, about 50% by weight, about 55% by weight, about 60% by weight, about 65% by weight, about 70% by weight, about 80% by weight, or about 90% by weight.

In yet another embodiment, provided herein is a method for preparing the coated electroactive particles provided herein, which comprises the steps of: i) mixing electroactive agglomerated particles provided herein with a mixture of precursors of a polymer in a solvent to form a slurry; ii) air-injecting the slurry to form particles; and iii) curing the particles from step ii) at an elevated temperature to form the coated electroactive particles. In certain embodiments, the polymer is a crosslinked polymer. In certain embodiments, the polymer is a crosslinkable polymer. In certain embodiments, the precursors are crosslinkable polymers. In certain embodiments, the precursors are monomers. In certain embodiments, the polymer is a polyamideimide. In certain embodiments, the polymer is a polyimide. In certain embodiments, the precursors are crosslinkable polyamideimides. In certain embodiments, the precursors are crosslinkable polyimides. In certain embodiments, the precursors are a polyanhydride and polyamine.

In yet another embodiment, provided herein is a method for preparing the coated electroactive particles provided herein, which comprises the steps of: i) mixing subparticles of a first electroactive material and subparticles of a second electroactive material with a polymer in a solvent to form a slurry; ii) air-injecting the slurry to form agglomerated particles; and iii) curing the agglomerated particles from step ii) at an elevated temperature to form the coated electroactive particles. In certain embodiments, the polymer is a crosslinkable polymer. In certain embodiments, the polymer is a polyamideimide. In certain embodiments, the polymer is a polyimide.

In still another embodiment, provided herein is a method for preparing the coated electroactive particles provided herein, which comprises the steps of: i) mixing subparticles of a first electroactive material and subparticles of a second electroactive material with a mixture of precursors of a polymer in a solvent to form a slurry; ii) air-injecting the slurry to form particles; and iii) curing the particles from step ii) at an elevated temperature to form the coated electroactive particles. In certain embodiments, the polymer is a crosslinked polymer. In certain embodiments, the polymer is a crosslinkable polymer. In certain embodiments, the precursors are crosslinkable polymers. In certain embodiments, the precursors are monomers. In certain embodiments, the polymer is a polyamideimide. In certain embodiments, the polymer is a polyimide. In certain embodiments, the precursors are crosslinkable polyamideimides. In certain embodiments, the precursors are crosslinkable polyimides. In certain embodiments, the precursors are a polyanhydride and polyamine.

The certain embodiments, the methods provided herein further comprise the step of grinding the coated electroactive particles into predetermined particle sizes.

The mixing step can be performed using any conventional method known to one of ordinary skill in the art, including, but not limited to, ball mixing, cospraying, such as thermal spraying and ultrasonic spraying. The production method will depend on the nature of the subparticles or the agglomerated particles employed.

In certain embodiments, the elevated temperature is ranging from about 100 to about 1,000° C., from about 150 to about 750° C., from about 200 to about 700° C., from about 300 to about 600° C., or from about 300 to about 500° C. In certain embodiments, the elevated temperature is about 200° C., about 250° C., about 300° C., about 350° C., about 400° C., about 450° C., about 500° C., about 550° C., or about 600° C.

In certain embodiments, the solvent is N-methylpyrrolidinone (NMP).

Cathodes

In one embodiment, provided herein is a cathode that comprises the electroactive agglomerated particles or coated electroactive particles provided herein, a current collector, and optionally a binder.

Examples of suitable materials for the current collector include, but are not limited to, aluminum, nickel, silver, and combinations thereof. Some suitable binders include those as described herein. In certain embodiments, the binder is selected from the group consisting of polyvinylidene fluoride (PVDF), carboxymethyl cellulose (CMC), styrene butadiene rubber (SBR), polyamideimides, polyimides, ethylene propylene diene monomer (EPDM), polyethylene oxides (PEO or PEG), polyethersulfones, polyphenylsulfones, and mixtures thereof.

In certain embodiments, the cathode is prepared by pressing the electroactive agglomerated particles or coated electroactive particles provided herein onto a current collector (e.g., a foil, strip, or sheet) to form a cathode. In certain embodiments, the cathode is prepared by dispersing the electroactive agglomerated particles or coated electroactive particles provided herein into a solvent, in one embodiment, N-methylpyrrolidinone (NMP), to form a slurry; and coating the slurry onto a current collect.

Lithium Secondary Battery

In certain embodiments, provided herein is a lithium secondary battery, which comprises a cathode comprising the agglomerated particles or coated electroactive particles provided herein, and optionally a binder; an anode; and an electrolyte that separates the anode and cathode.

The anode can be any anode for a lithium secondary battery known to one of ordinary skill in the art. In one embodiment, the anode comprises a current collector, an electroactive material, and optionally a binder, wherein the electroactive material is coated onto the surface of the current collector.

In certain embodiments, the current collector of the anode is copper. In certain embodiments, the current collector is copper. In certain embodiments, the current collector is copper foil. In certain embodiments, the current collector is rolled copper foil. In certain embodiments, the current collector is electrodeposited copper foil. In certain embodiments, the copper has a horizontal tensile strength ranging from about 100 to about 500 $N/mm^2$, from about 200 to about 450 $N/mm^2$, from about 250 to about 450 $N/mm^2$, or from about 300 to about 400 $N/mm^2$. In certain embodiments, the copper has a horizontal tensile strength of about 200, about 220, about 240, about 260, about 270, about 280, about 290, about 300, about 310, about 320, about 330, about 340, about 360, about 380, about 400, about 420, about 440, about 460, about 480, or about 500 $N/mm^2$. In certain embodiments, the copper has a vertical tensile strength ranging from about 100 to about 500 $N/mm^2$, from about 200 to about 450 $N/mm^2$, from about 250 to about 450 $N/mm^2$, or from about 300 to about 400 $N/mm^2$. In certain embodiments, the copper has a vertical horizontal strength of about 200, about 220, about 240, about 260, about 270, about 280, about 290, about 300, about 310, about 320, about 330, about 340, about 360, about 380, about 400, about 420, about 440, about 460, about 480, or about 500 $N/mm^2$.

In certain embodiments, the electroactive material of the anode is a carbonaceous material. In certain embodiments, the electroactive material is mesocarbon microbead. In certain embodiments, the carbonaceous material is graphite, coke, petroleum coke, carbon, a partially or fully graphitized carbon, carbon-black, hard carbon, or a mixture thereof. In certain embodiments, the electroactive material of the anode is coated electroactive particles as described in U.S. Provisional Pat. Appl. Ser. No. 61/232,431, filed Aug. 9, 2009, the disclosure of which is incorporated herein by reference in its entirety.

Some suitable binders for the anode include those as described herein. In certain embodiments, the binder is selected from the group consisting of polyvinylidene fluoride (PVDF), carboxymethyl cellulose (CMC), styrene butadiene rubber (SBR), polyamideimides, polyimides, ethylene propylene diene monomer (EPDM), polyethylene oxides (PEO or PEG), polyethersulfones, polyphenylsulfones, and mixtures thereof.

Any electrolytes known to one of ordinary skill in the art can be used in the battery provided herein. In certain embodiments, the electrolyte comprises one or more lithium salts and a charge carrying medium in the form of a solid, liquid, or gel. Suitable lithium salts include, but are not limited to $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

Suitable examples of solid charge carrying media include, but are not limited to, polymeric media, e.g., polyethylene oxide. Suitable examples of liquid charge carrying media include, but are not limited to, ethylene carbonate, propylene carbonate, dimethyl carbonate, diethyl carbonate, ethyl-methyl carbonate, butylene carbonate, vinylene carbonate, fluorinated ethylene carbonate, fluorinated propylene carbonate, γ-butylrolactone, methyl difluoroacetate, ethyl difluoroacetate, dimethoxyethane, diglyme (i.e., bis(2-methoxyethyl) ether), tetrahydrofuran, dioxolane, and combinations thereof. Some examples of charge carrying media gels include those described in U.S. Pat. Nos. 6,387,570 and 6,780,544, the disclosure of each of which is incorporated herein by reference in its entirety.

The disclosure will be further understood by the following non-limiting examples.

EXAMPLES

Example 1

Electrode and Cell Fabrication

Negative and positive electrodes were coated onto an Al foil and Cu foil, respectively, using a small doctor blade coater, and then calendared to designed thickness. The electrodes were then slited to designed width and dried in a vacuum oven at an elevated temperature. Once the electrodes were dried, all subsequent cell fabrication steps were carried out inside a drying room at a Dew point of about −35° C. The electrodes were tabbed first and then wound into jellyrolls. The jellyrolls were then inserted into an 18650 can and an EC based electrolyte was put into the cell under vacuum. The cells were crimped for sealing after electrolyte filling. The cell was then be aged and formed.

Example 2

Cell Testing

The cell was tested one week after formation. The cell capacities and voltage profiles at ~1 C and ~5 C (or ~10 C for the Mn mixed particle) were measured by the following procedure: i) the cell was charged to 3.9V at 0.6A for 2.5 hours; ii) the cell then rested for several minutes; iii) the cell was discharged to 2.2 V at 1 C rate; iv) the cell rested for another several minutes; v) the cell was then charged to 3.9V at 0.6 A; vi) the cell rested for several minutes; and vii) the cell was discharged to 2.2 V at ~5 C or ~10 C depending on the mixed particles.

Example 3

Preparation of Electroactive Agglomerated Particles

Electroactive agglomerated particles comprising $LiFePO_4$ nanoparticles, metal oxide nanoparticles, coal tar, and carbon black were prepared by mixing $LiFePO_4$ and metal oxide nanoparticles together, contacting the subparticle mixture with a coal tar fume and carbon black, and ball mixing the nanoparticle mixture. The metal oxide particles used herein are $LiMn_2O_4$, $Li(NiCoMn)_{1/3}O_2$, or $LiAl_{0.05}Ni_{0.8}Co_{0.15}O_2$ nanoparticles. The electroactive agglomerated particles can be crushed into predetermined particle sizes (e.g., in the range of about 1 to about 50 μm).

Example 4

Preparation of Electroactive Agglomerated Particles $Fe_2O_3$ is mixed with $Li_2CO_3$ and $(NH_4)_2HPO_4$ in the presence of carbon. To the mixture are then added nanoparticles of a second electroactive material. The mixture is then thoroughly mixed again. The resulting mixture is heated under $N_2$ at an elevated temperature from about 700 to about 850° C. to yield electroactive agglomerated particles comprising $LiFePO_4$ nanoparticles and the nanoparticles of a second electroactive material. The electroactive agglomerated particles can be crushed into predetermined particle sizes (e.g., in the range of about 1 to about 50 μm).

Example 5

Preparation of Electroactive Agglomerated Particles $Fe_2O_3$ particles are mixed with $LiH_2PO_4$ and $Mg(OH)_2$ particles in the presence of carbon. To the mixture are added nanoparticles of a second electroactive material. The mixture is then thoroughly mixed. The resulting mixture is heated under $N_2$ at an elevated temperature from about 700 to about 850° C. to yield electroactive agglomerated particles comprising $LiFe_{1-x}Mg_xPO_4$ nanoparticles and the nanoparticles of a second electroactive material, where x is as defined herein. The electroactive agglomerated particles can be crushed into predetermined particle sizes (e.g., in the range of about 1 to about 50 μm).

Example 6

Preparation of Electroactive Agglomerated Particles $LiFePO_4$ is prepared via a sol-gel synthesis from $Fe(NO_3)_3 \cdot 9H_2O$, lithium acetate dehydrate, and phosphoric acid (85%). The iron nitrate and lithium acetate are combined with phosphoric acid (85%) in a stoichiometric ratio of 1:1:1. Distilled water is then added until all the constituents are completely dissolved. Nanoparticles of a second electroactive material, such as a metal oxide, are added. The pH of the mixture is adjusted to 8.5 to 9.5 using $NH_4OH$ to form a sol. The sol is then heated on a hot plate with stirring to form a gel. The sample is then fired to 500° C. The mixture is then ground using a planetary ball mill in a solvent, such as ethanol and acetone. The grinding solvent is then evaporated under nitrogen and the resulting powder is thoroughly mixed and fired to about 600° C. to yield embedded electroactive agglomerated particles which comprises $LiFePO_4$ nanoparticles and the nanoparticles of a second electroactive material. The electroactive agglomerated particles can be crushed into predetermined particle sizes (e.g., in the range of about 1 to about 50 μm).

Example 7

Preparation of Electroactive Agglomerated Particles $LiFePO_4$, $LiAl_{0.05}Ni_{0.8}Co_{0.15}O_2$, and carbon nanoparticles were ball mixed with coke. The mixture was hot spray dried to form agglomerated particles, which were further heat treated at about 300° C. The agglomerated particles were then crushed to form electroactive agglomerated particles having a particle size in the range of 1 to 50 μm.

Two different types of electroactive agglomerated particles were prepared. Agglomerated Particle I comprises about 78% by weight of $LiFePO_4$, about 20% by weight of $LiAl_{0.05}Ni_{0.8}Co_{0.15}O_2$, and about 1.5% carbon. Agglomerated Particle II comprises about 68% by weight of $LiFePO_4$, about 30% by weight of $LiAl_{0.05}Ni_{0.8}Co_{0.15}O_2$, and about 1.2% carbon.

Their electrochemical properties were compared with those of Physical Mixture II, which were a simple physical mixture comprising about 68% by weight of $LiFePO_4$, about 30% by weight of $LiAl_{0.05}Ni_{0.8}Co_{0.15}O_2$, and about 1.2% carbon. The results are summarized in Table 1.

TABLE 1

| Negative | Positive Material | Cycle Number | Capacity loss |
|---|---|---|---|
| MCMB[a] | Agglomerated Particle I | 310 | 0.0% |
| MCMB[a] | Agglomerated Particle I | 373 | 1.2% |
| Synthetic graphite | Agglomerated Particle I | 353 | 3.3% |
| MCMB[a] | Agglomerated Particle II | 308 | 4.4% |
| Synthetic graphite | Agglomerated Particle II | 304 | 1.5% |
| MCMB[b] | Physical Mixture II | 330 | 12.4% |
| MCMB[a] | Physical Mixture II | 123 | 10.6% |
| MCMB[a] | Physical Mixture II | 119 | 9.5% |
| MCMB[a] | Physical Mixture II | 119 | 8.7% |
| MCMB[a] | Physical Mixture II | 119 | 7.3% |

[a]Mesocarbon microbead and SBR
[b]Mesocarbon microbead and a non-SBR binder

The cycle life of the cells was determined by charging the cells to 4V at 0.7 C, resting for 10 min, and then discharging to 2.2 V at 0.5 C. The capacity loss was calculated by the equation: (initial capacity−capacity at the last cycle)/initial cell capacity.

Example 8

Preparation of Electroactive Agglomerated Particles

A uniform suspension of $LiFePO_4$, $LiAl_{0.05}Ni_{0.8}Co_{0.15}O_2$, carbon nanoparticles, and coke in a solvent (e.g., NMP) is hot spray dried to form agglomerated particles. The agglomerated particles are further heat treated at an elevated temperature (e.g., about 300° C.) to form electroactive agglomerated particles, which are then crushed into predetermined particle sizes (e.g., in the range of about 1 to about 50 μm).

Example 9

Preparation of Coated Electroactive Particles

The agglomerated particles from one of Examples 3 to 8 are sprayed with a solution of a polyamideimide (e.g., TORLON® AI-30, TORLON® AI-50, TORLON® 4000, or TORLON® 4203L) in a solvent (e.g., N-methylpyrrolidinone). The wet agglomerated particles are further cured at an elevated temperature (e.g., about 300° C.) to form coated electroactive particles. The coated electroactive particles are then crushed into predetermined particle sizes (e.g., in the range of about 1 to about 50 μm).

Example 10

Preparation of Coated Electroactive Particles

The agglomerated particles from one of Examples 3 to 8 are sprayed with a solution of precursors of a polyimide (e.g., U-VARNISH®) in a solvent (e.g., N-methylpyrrolidinone). The wet agglomerated particles are further cured at an elevated temperature (e.g., about 300° C.) to form coated electroactive particles. The coated electroactive particles are then crushed into predetermined particle sizes (e.g., in the range of about 1 to about 50 μm).

Example 11

Preparation of Coated Electroactive Particles

The agglomerated particles from one of Examples 3 to 8 are added to a solution of a polyamideimide (e.g., TORLON® AI-30, TORLON® AI-50, TORLON® 4000, or TORLON® 4203L) in a solvent (e.g., N-methylpyrrolidinone) to form a uniform suspension, which is hot spray dried to form coated electroactive particles. The coated electroactive particles are further cured at an elevated temperature (e.g., about 300° C.), and then crushed into predetermined particle sizes (e.g., in the range of about 1 to about 50 μm).

Example 12

Preparation of Coated Electroactive Particles

The agglomerated particles from one of Examples 3 to 8 are added to a solution of precursors of a polyimide (e.g., U-VARNISH®) in a solvent (e.g., N-methylpyrrolidinone) to form a uniform suspension, which is hot spray dried to form coated electroactive particles. The coated electroactive particles are further cured at an elevated temperature (e.g., about 300° C.), and then crushed into predetermined particle sizes (e.g., in the range of about 1 to about 50 μm).

Example 13

Preparation of Coated Electroactive Particles

A uniform suspension of $LiFePO_4$ nanoparticles, doped $LiNiO_2$ (e.g., $LiAl_{0.05}Ni_{0.8}Co_{0.15}O_2$) nanoparticles, carbon nanoparticles, and coke in a solvent (e.g., N-methylpyrrolidinone) that contains a polyamideimide (e.g., TORLON® AI-30, TORLON® AI-50, TORLON® 4000, or TORLON® 4203L) is hot spray dried to form coated electroactive particles. The coated electroactive particles are further cured at an elevated temperature (e.g., about 300° C.), and then crushed into predetermined particle sizes (e.g., in the range of about 1 to about 50 μm).

Example 14

Preparation of Coated Electroactive Particles

A uniform suspension of $LiFePO_4$ nanoparticles, doped $LiNiO_2$ (e.g., $LiAl_{0.05}Ni_{0.8}Co_{0.15}O_2$) nanoparticles, carbon nanoparticles, and coke in a solvent (e.g., N-methylpyrrolidinone) that contains precursors of a polyimide (e.g., U-VARNISH®) is hot spray dried to form coated electroactive particles. The coated electroactive particles are further cured at an elevated temperature (e.g., about 300° C.), and then crushed into predetermined particle sizes (e.g., in the range of about 1 to about 50 μm).

Example 15

Preparation of Coated Electroactive Particles

Doped $LiNiO_2$ (e.g. $LiAl_{0.03}Ni_{0.8}Co_{0.17}O_2$) having an average particle size of 10 μm was cryomilled to form nanoparticles having an average particle size of 100 nm. $LiFePO_4$ having an average particle size of 0.5 to 2 μm was also cryomilled into nanoparticles having an average particle size of 100 nm. The doped $LiNiO_2$ (30 g) and $LiFePO_4$ (70 g) nanoparticles were then mixed with a polyamideimide (1 g) in a solvent to form a slurry, which was spray dried to form coated electroactive particles under the following conditions: air pressure, 120 to 125 psi; out-temperature, 60° C.; in-temperature, 150° C.; flow rate, 5.0 mL/min; and atomizing air, 0.2 MPa. The coated electroactive particles were further cured at an elevated temperature (e.g., about 300° C.).

The coated electroactive particles were characterized with scanning electron microscope/energy dispersive using X-ray analysis (SEM/EDX). The coated electroactive particles shown in FIGS. 7A to 7D are spherical in shape. The coated electroactive particles shown in FIGS. 8A to 8D are spherical and/or spheroidal in shape. As shown in FIGS. 9A and 9B, the EDX spectra of two individual beads from the same batch of preparation are substantially the same, indicating that the coated electroactive particles are homogenous. The coated electroactive particles in FIGS. 8 and 9 are from the same batch.

Example 16

Preparation of Coated Electroactive Particles

Doped $LiNiO_2$ (e.g., $LiAl_{0.03}Ni_{0.8}Co_{0.17}O_2$) and $LiFePO_4$ nanoparticles were prepared as described in Example 15. The doped $LiNiO_2$ (30 g) and $LiFePO_4$ (70 g) nanoparticles were then mixed with CMC (1 g) in a solvent to form a slurry, which was spray dried to form coated electroactive particles under the following conditions: air pressure, 120 to 125 psi; out-temperature, 60° C.; in-temperature, 150° C.; flow rate, 5.0 mL/min; and atomizing air, 0.2 MPa. The coated electroactive particles were further cured at an elevated temperature (e.g., about 300° C.).

The coated electroactive particles were characterized with scanning electron microscope/energy dispersive using X-ray analysis (SEM/EDX) and the results are shown in FIGS. 10A to 10D.

The examples set forth above are provided to give those of ordinary skill in the art with a complete disclosure and description of how to make and use the claimed embodiments, and are not intended to limit the scope of what is disclosed herein. Modifications that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. An electroactive agglomerated particle comprising from about 65% to about 80% by weight of $LiFePO_4$, from about 35 to about 20% by weight of $LiAl_{0.05}Ni_{0.8}Co_{0.15}O_2$, and from about 1% to about 2% by weight of carbon.

2. An electroactive agglomerated particle comprising 70% by weight of $LiFePO_4$, about 30% of $LiAl_{0.03}Ni_{0.8}Co_{0.17}O_2$, and about 1% by weight of a polyamideimide.

* * * * *